United States Patent [19]

Schanel et al.

[11] Patent Number: 5,704,028
[45] Date of Patent: Dec. 30, 1997

[54] GRAPHICS SYSTEMS AND METHOD HAVING DATA FIELDS AND SHAPE PLACEMENT CONTROL

[75] Inventors: Scott Schanel, San Franciso; Gerald R. Hogsett, II, San Carlos, both of Calif.

[73] Assignee: Micrografx, Inc., Richardson, Tex.

[21] Appl. No.: 361,125

[22] Filed: Dec. 21, 1994

[51] Int. Cl.$^6$ ........................................ G06F 15/00
[52] U.S. Cl. ........................................ 395/140
[58] Field of Search .................. 395/140, 133, 395/141, 142, 143; 345/113, 114, 118

[56] References Cited

U.S. PATENT DOCUMENTS

| | | | |
|---|---|---|---|
| 4,937,761 | 6/1990 | Hassett | 364/518 |
| 5,200,740 | 4/1993 | Paxton | 340/735 |
| 5,214,755 | 5/1993 | Mason | 395/147 |
| 5,291,587 | 3/1994 | Kodosky et al. | 395/500 |
| 5,317,681 | 5/1994 | Glassner | 395/141 |
| 5,333,243 | 7/1994 | Best et al. | 395/109 |
| 5,337,404 | 8/1994 | Baudelaire et al. | 395/141 |
| 5,481,668 | 1/1996 | Marcus | 395/161 |
| 5,485,175 | 1/1996 | Suzuki | 395/156 |

OTHER PUBLICATIONS

BenchMarker™ Plus Toolset 3.0, Getting Started, Fleet & Partners™.
BenchMarker™ Plus Toolset 3.0, Using, Fleet & Partners™.

*Primary Examiner*—Phu K. Nguyen
*Attorney, Agent, or Firm*—Baker & Botts, L.L.P.

[57] ABSTRACT

A computer graphics program executed by a processor (12) for generating a graphics chart on a computer display (26) are provided. The program includes instructions for controlling the placement of objects on the chart and for relating data to the objects in the chart. The program also includes instructions for generating cause and effect diagrams directly onto the computer display (26).

56 Claims, 16 Drawing Sheets

GRAPHICS SYSTEMS AND METHOD HAVING DATA FIELDS AND SHAPE PLACEMENT CONTROL

CROSS REFERENCE TO RELATED APPLICATIONS

This application relates to U.S. Patent Application Ser. No. 08/314,041, entitled *Graphics System and Method*, filed Sep. 27, 1994, now U.S. Pat. No. 5,588,108.

TECHNICAL FIELD OF THE INVENTION

This invention relates to the field of computer graphics systems, and more particularly, to a system and method for creating graphics having data fields and shape placement control.

BACKGROUND OF THE INVENTION

Virtually every organization is engaged in business process re-engineering, total quality management, and benchmarking. The goal of these efforts is to transform the organization from an internally-focused, functional hierarchy burdened by bureaucracy to a streamlined process oriented horizontal company focused on customer satisfaction.

The challenge among these organizations is how to effectively implement quality programs that focus on customer satisfaction. Implementing successful change requires using the right tools. The elements of performance improvement include understanding the current process and evaluating and improving process speed, costs, and quality. In addition, continuous improvement and teamwork require the use of effective problem-solving and analysis tools. Process flow charts, pareto charts, run charts, control charts, and cause-and-effect diagrams are all essential tools for effective process improvement.

Currently available tools for organizational analysis may include expensive and complex case tools that often require high-end expensive workstations for operation. Using currently available computer graphics systems, the charts mentioned above can be created as computer graphics. Unfortunately, these prior systems may be difficult to use requiring significant training time before the user feels comfortable with and proficient in using the system. Additionally, these prior systems have no capability for integrating data, e.g., cost and time data, with the shapes in the computer generated chart. This requires the user to present their organization's processes with graphics but also requires a separate spreadsheet for collecting the data associated with the processes. Needing both a graphics chart and spreadsheet to fully represent an organization's processes not only requires additional time in analyzing the organization, and therefore expense, but may also hinder effective use of the available information.

Also, currently available process development or analysis tools do not provide an easy and quick method for generating cause-and-effect diagrams. Cause-and-effect diagrams have gained widespread acceptance as a useful tool in analyzing the causes that contribute to a given effect. These diagrams provide graphically a tremendous amount of information on the causes that contribute to a given effect. Unfortunately, these charts are typically generated by hand with paper and pencil or with general computer graphics systems that do not provide an easy to use system for generating and editing cause-and-effect diagrams.

Benchmarkerv2Plus (Benchmarker™) is an example of a previously developed software tool that has limited capability to generate cause and effect diagrams. When using Benchmarker™, a user must enter the data for the cause and effect diagram into a worksheet or grid. Benchmarker™ then creates the cause and effect diagram with the entered data. Benchmarker™ is also limited to generating cause and effect diagrams with only four major cause lines and only one level of sub-cause lines. Benchmarker™, therefore, limits the user's ability, to efficiently generate a thorough cause and effect diagram.

Additionally, prior computer graphics systems do not control the placement of shapes in a chart. Prior graphics systems may use a background grid system so that shapes may be placed on the grid in order to orient and align the shapes. Prior systems do not provide for shape to shape alignment nor for controlled spacing or edge alignment of the shapes within a graphics chart. This may make generating clean, professional looking graphics difficult. This is particularly true when the graphics are complicated, containing many shapes and lines, as is typically the case when creating a graphics chart to represent an organization's processes.

SUMMARY OF THE INVENTION

In accordance with the present invention, a user friendly computer graphics system and method are provided that substantially eliminate or reduce disadvantages and problems associated with previously developed graphics systems and methods.

One aspect of the present invention provides a computer graphics program executed by a processor for generating graphics charts. The program incudes first processor implemented instructions for placing a plurality of shapes in a chart and second processor implemented instructions for maintaining positioning coordinates for each shape in the chart. The program also includes third processor implemented instructions responsive to a move command for moving one of the shapes in the chart with respect to the remaining stationary shapes. Also included in the program are fourth processor implemented instructions for comparing the distance between each of the stationary shapes in the chart and the moving shape as the moving shape is moved in the chart. The program also includes fifth processor implemented instructions for setting release coordinates for the moving shape with respect to at least one stationary shape when the moving shape is brought within a predetermined offset to a first distance.

Another aspect of the present invention provides a method for controlling the placement of a shape on a graphics chart generated with a computer having a processor. The method includes maintaining positioning coordinates for each shape in the chart and maintaining positioning coordinates for a moving shape in the chart with respect to the remaining stationary shapes in the chart while the moving shape is moving. The method also includes comparing the distance between each of the stationary shapes in the chart and the moving shape as the moving shape is moved in the chart. Additionally the method includes setting release coordinates for the moving shape with respect to at least one stationary shape when the moving shape is brought within a predetermined offset to a first distance.

Another aspect of the present invention provides a computer graphics program executed by a processor for generating graphics charts. The program includes first processor implemented instructions for placing a plurality of shapes in a chart and second processor implemented instructions for maintaining positioning coordinates for each shape in the chart. The program also includes third processor implemented instructions responsive to a move command for moving one of the shapes in the chart with respect to the remaining stationary shapes. Additionally, the program includes fourth processor implemented instructions for comparing the location between each of the stationary shapes in the chart and the moving shape as the moving shape is moved in the chart. The program also includes fifth processor implemented instructions for determining when the coordinates for the moving shape coincide at least in part with the coordinates for at least one of the stationary shapes. Additionally, the program includes sixth processor implemented instructions for setting release coordinates for the moving shape with respect to the at least one stationary shape to align with a channel extending from the at least one stationary shape so that the moving shape aligns with the at least one stationary shape when the moving shape is released.

Another aspect of the present invention provides a method for controlling the placement of a shape on a graphics chart generated with a computer having a processor. The method includes maintaining positioning coordinates for each shape in the chart and maintaining positioning coordinates for a moving shape in the chart with respect to the remaining stationary shapes in the chart while the stationary shape is moving. The method includes comparing the positioning coordinates between each of the stationary shapes in the chart and the moving shape as the moving shape is moved in the chart. Additionally, the method includes determining when the coordinates for the moving shape coincide at least in part with the coordinates for at least one stationary shape. The method also includes setting release coordinates for the moving shape with respect to the at least one stationary shape to align with a channel extending from the at least one stationary shape so that the moving shape aligns with the at least one stationary shape when the moving shape is released.

Another aspect of the present invention provides a computer graphics program executed by a processor for generating a cause and effect chart on a computer display. The program includes first processor implemented instructions for generating on the display a cause and effect chart template containing a plurality of cause lines and cause text. The program also includes second processor implemented instructions for entering customized text onto the cause and effect chart template on the display responsive to a command.

Another aspect of the present invention provides a method for generating a cause and effect chart on a computer display with a computer having a processor. The method includes generating on the display a cause and effect chart template containing a plurality of cause lines and cause text. The method also includes displaying customized text entered directly into the cause and effect chart template.

Another aspect of the present invention provides a computer graphics program executed by a processor for generating a graphics chart containing objects and data. The program includes first processor implemented instructions for placing a plurality of objects on the chart and second processor implemented instructions for receiving data. The program also includes third processor implemented instructions for relating data for each object to the object.

Yet another aspect of the present invention provides a method for generating a computer graphics chart containing objects and data on a computer display with a computer having a processor. The method includes generating on the display a plurality of objects and receiving data for the chart. The method also includes relating the data for each object to the object.

The present system provides all the tools needed for documenting, analyzing, measuring, and improving performance in an organization. The system allows for mapping out process flows, costs, cycle times, quality indices, and other variables. The present system allows the user to identify problems and improve internal business processes to increase the organization's competitiveness.

The present graphics system and method provides numerous technical advantages. One technical advantage of the present invention is that it provides a user friendly computer graphics program.

An additional technical advantage of the present invention is that it can be used without extensive training or practice. This allows the user to immediately begin creating professional, clean graphics.

An additional technical advantage of the present invention is that it includes a computer program that runs on standard or commercially available computer equipment and does not require high-end workstations as may be required for some previously developed computer graphics programs. This maintains the computer platform costs for practicing the present invention relatively low.

Yet another technical advantage of the present invention is that it provides for integrating data and shapes in a single graphics chart. This eliminates the need for maintaining a data spreadsheet for a process separate from a graphics chart representing the process. Integrating data and shapes into a graphics chart increases the information in the chart, and therefore, increases the effectiveness of the chart. Integration of data and shapes into a single chart also minimizes and reduces the time and expense associated with generating two separate charts.

The present invention also provides a technical advantage of controlling the placement of shapes within a graphics chart. The present invention controls the orientation and alignment of shapes within a graphics chart so that professional, clean graphics can be quickly and efficiently generated.

Yet another technical advantage of the present system is that it provides a method and system for generating cause-and-effect diagrams. The present computer system allows a user to quickly generate and edit professional, clean cause-and-effect diagrams.

BRIEF DESCRIPTION OF THE DRAWINGS

For a more complete understanding of the present invention and advantages thereof, reference is now made to the accompanying description taken in conjunction with the accompanying drawings in which like reference numbers indicate like features and wherein.

DETAILED DESCRIPTION OF THE INVENTION

Preferred embodiments of the present invention are illustrated in the FIGURES, like numerals being used to refer to like and corresponding parts of the various drawings.

Figure 1:
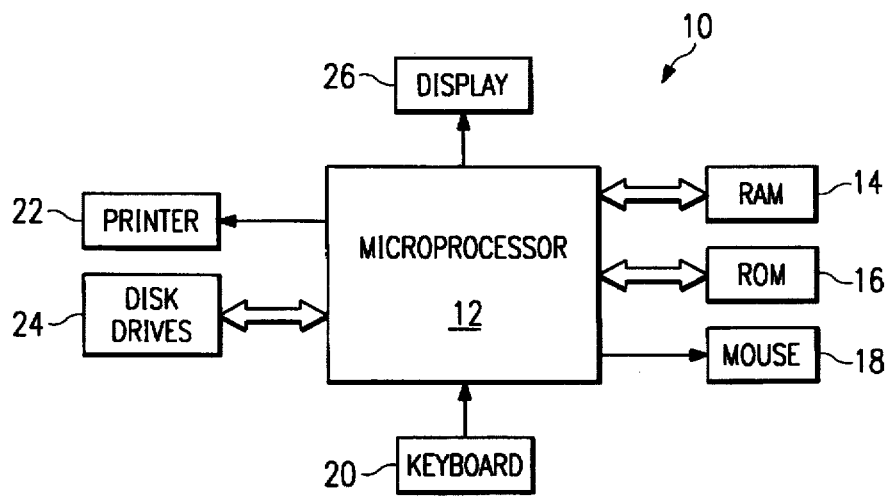
FIG. 1 illustrates a schematic block diagram for a computer system that may be employed in practice of the present invention.

FIG. 1 illustrates computer system 10 for implementing the present invention. Computer system 10 is adapted to execute with any of the well-known, MS-DOS, PC-DOS, OS2, MAC-OS, or Windows™ operating systems. Computer system 10 includes a microprocessor 12, random access memory (RAM) 14, read-only memory (ROM) 16, mouse 18, keyboard 20, and output devices, such as printer 22, disk drives 24, and display 26. The present invention provides a software computer program that may be stored in RAM 14, ROM 16, or disk drives 24, that is executed by microprocessor 12. The present invention is adapted for implementation in a computer language such as, for example, C or C++ that may be compiled based on the instructions of the desired computer operating system.

Operation of the present invention is described hereinafter, and where appropriate, in connection with flow charts. Those of ordinary skill in the art can readily convert the concepts described and represented by the flow charts into executable computer instructions for implementing the present invention.

Computer system 10 can be any computer running, for example, Windows™, 3.1 operating system or higher. Microprocessor 12, in the preferred embodiment, is an 80386™ microprocessor or higher, e.g., 80486™ or Pentium™ microprocessor. Disk drives 24 should have storage capacity on the order of 8 megabytes (MB) and RAM 14 should have storage capacity on the order 2 MB, while 4 MB are generally preferred. Display 26 should be a videographics array (VGA) or have a Windows™ compatible graphics card. The embodiments described above for computer system 10 are provided by way of an example only. Those skilled in the art will appreciate that the implementation of the present invention is not limited to the configurations described.

The present invention provides several tools that allow a user to quickly and easily create clean and professional looking graphics. The graphics that may be generated in accordance with the present system include flow charts, process flow charts, pareto charts, run charts, control charts, and cause-and-effect diagrams. The concepts described in accordance with the present invention are currently available as a software package known as ABC FlowCharter 3.0 and ABC ToolKit 1.0 available from Micrografx, Inc., of Richardson, Tex.

Figure 2:
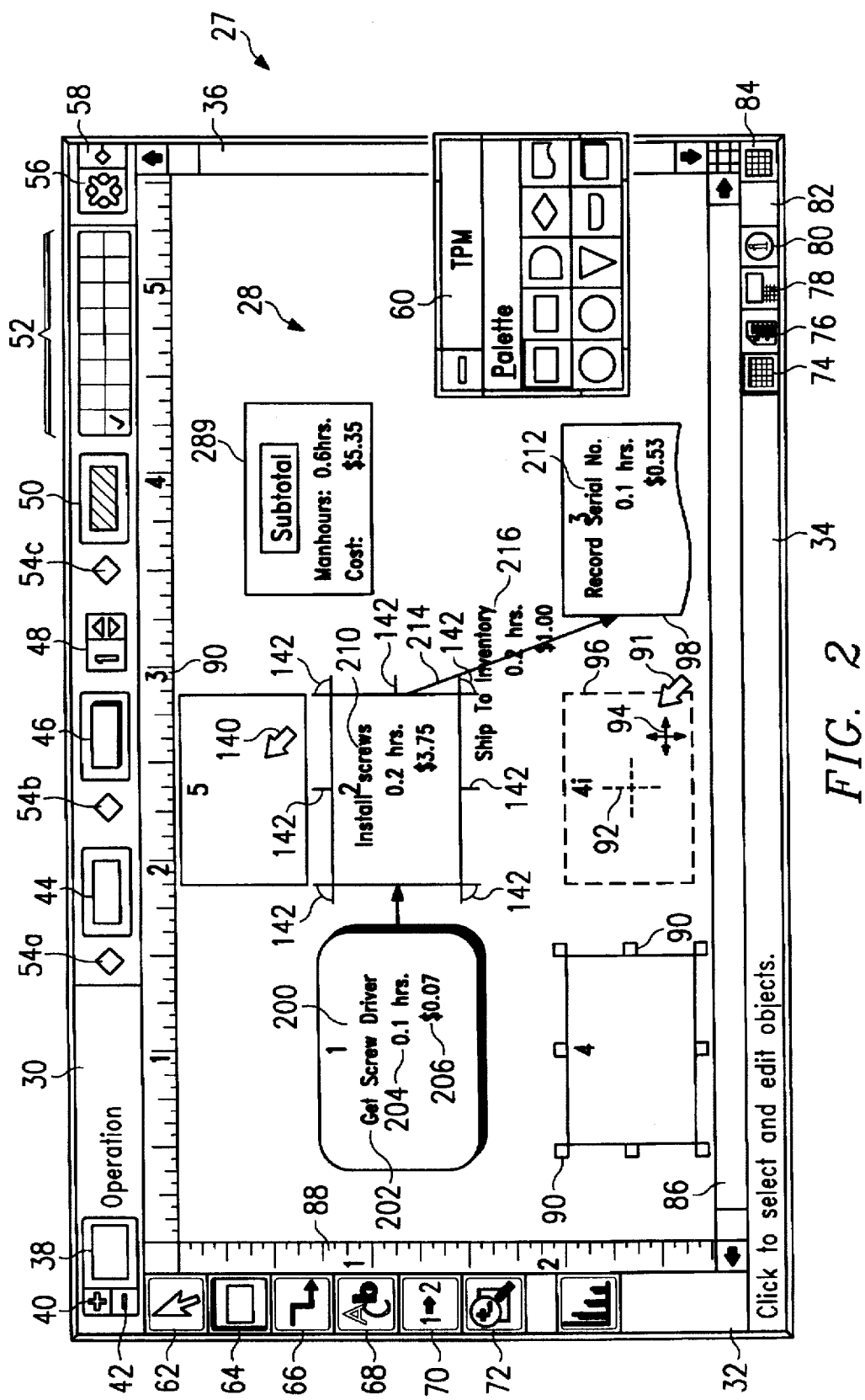
FIGS. 2 and 3 show exemplary computer screens containing flow charts generated in accordance with the present invention.

FIG. 2 illustrates example window 27 that may be generated by processor 12 on display 26 of computer system 10. Window 27 includes flow chart 28 generated in accordance with the present system. Window 27 is bounded by top tool bar 30, left tool bar 32, bottom tool bar 34 and vertical scroll bar 36. Computer system 10 employs common Windows™ interface techniques in generating window 27 and allows the user to select different features and operations for manipulating the information in window 27. The tool bars and scroll bars aid the user of the present graphics program in preparing a graphics chart.

Top tool bar 30 provides the user with point and click access to a number of functions available with the present system. Top tool bar 30 may also be referred to as the shape attribute ribbon. Shape sample button 38 shows the current settings for shapes, including the border and shadow style and width, fill pattern, and color. These settings are applied to this next shape placed in chart 28. When this button is selected, the preferred shape settings menu opens. Add setting button 40 can be used to add settings to the settings currently selected for the tool to a preferred shape settings menu. The add settings button is active only when a change to shape attribute ribbon 30 is made. Delete settings button 42 deletes the selected item from the preferred shape settings menu.

Top tool bar 30 also includes border style button 44 that lets the user choose the shape border style, e.g., dashed line or solid line. When border style button 44 is selected, the border style menu opens. The user may use the border style menu to choose a border style for a selected shape or the next shape that is placed on chart 28.

Shadow style button 46 is also included in top tool bar 30. Shadow style button 46 lets the user choose a drop shadow for the shapes on chart 28. Width box 48, shows the current width value for the border or shadow selected. The width of the border or shadow may be increased or decreased by selecting the arrows associated with width box 48.

Top tool bar 30 also includes fill pattern button 50 that lets the user fill selected shapes with a solid color or pattern. When this button is selected, a fill pattern menu opens so that the user may select a different fill pattern for the shapes on chart 28.

Shape ribbon colors 52 may be selected to apply colors to shape borders, shadows, and the fill patterns. The color chosen from shape ribbon color 52 is applied to the option selected using apply buttons 54. When a color is double clicked, a set custom color dialog box opens that can be used to define a custom color. Border style button 44, shadow style button 46, and fill pattern button 50 each have apply buttons 54a, 54b, and 54c, respectively. When an apply button is selected, the associated width, shadow, or fill pattern selections made with border style button 44, shadow style button 46, and fill pattern button 50 are applied to the selected shape in accordance with the selected options.

Top tool bar 38 also includes shape properties button 56 that allows the user to choose the properties for a selected shape in chart 28. When this button is selected, a shape properties dialog box opens. This box can be used to change the shape's name, edit connect points for the shape, move the shape number, move and resize the text area, and choose other shape property options. Replace shape button 58 in top tool bar 30 replaces the selected shapes in the chart with the shape currently selected in shape pallet 60.

Left tool bar 32 includes object selector tool button 62 that, when selected, allows the user to select and resize objects in a chart. When the object selector tool is selected, top tool bar 30 displays a set of buttons specific to this tool.

Shape tool button 64 in left tool bar 32 allows the user to select shapes from shape pallet 60 and place shapes in chart 28. Selecting shape tool button 64 also allows the user to choose shape attributes and properties. In the example of window 27 in FIG. 2, top tool bar 30 displays the shape tool buttons available when shape tool button 64 is selected. Selecting each of the other tools available in left tool bar 32 provides a different set of tool buttons in top tool bar 30 associated with that tool.

Left tool bar 32 also includes line tool button 66 that may be used to connect shapes with different types of lines and to choose line styles and arrows. When line tool button 66 is selected, top tool bar 30 displays a set of buttons specific to this tool.

Text tool button 68 is selected by the user to enter and edit text. When the text tool button 68 is selected, top tool bar 30 displays a set of buttons specific to this tool.

Number tool button 70 in left tool bar 32 allows the user to hide shape numbers and to renumber shapes. When the number tool is selected, top tool bar 30 displays a set of buttons specific to this tool.

View tool button 72 allows the user to change the view of a chart. When the view tool button 72 is selected, the view of chart 28 in window 27 can be changed. View tool button 72 allows for zooming in and out on flow chart 28 in window 27.

Bottom tool bar 34 includes shape pallet button 74 that opens and closes shape pallet 60. Shape pallet 60 displays the shapes that can be placed on a chart. Note button 76 in bottom tool bar 34 opens and closes a note window that may be used to attach text to a selected shape.

Bottom tool bar 34 also includes field view viewer button 78 that opens and closes a field viewer if data fields are defined for shapes in the chart. The operation of field viewer button 78 will be described in mote detail hereinafter. Index button 80 opens and closes the index window. The index window displays a list of charts and shapes available to the user.

Guidelines button 82 in bottom tool bar 34 may be selected to display and hide vertical and horizontal guidelines that may be placed on a chart. The guidelines may be used when desired to align shapes within the chart. It is noted that guidelines are not shown for chart 28 in FIG. 2. Color button 84 displays the set custom color dialog box. This dialog box can be used to change colors displayed in top tool bar 30, left tool bar 32, and bottom tool bar 34.

Window 27 also has horizontal scroll bar 86 for moving horizontally across window 27. Vertical ruler 88 and horizontal ruler 90 may be provided with window 27 to show the actual dimensions in chart 28.

Using the tools described above, a user can use the present computer system to generate a graphics chart like flow chart 28 in FIG. 2. The present system uses well-known mouse point-and-click techniques to select shapes as well as to draw lines on a chart. Flow chart 28 in FIG. 2 includes external operation step 1, operation step 2 and document step 3. These steps in flow chart 28 may represent a given process. These shapes are placed on chart 28 by selecting shapes from shape pallet 60. The lines connecting these shapes can be automatically added or drawn with line tool button 66.

One of the technical advantages of the present invention is that it provides control over the placement of shapes, or shape placement control, in a graphics chart. Some of the novel shape placement control features that may be provided are snap together shapes, shape channel alignment, shape touch alignment, and smart shape spacing.

Figure 3:
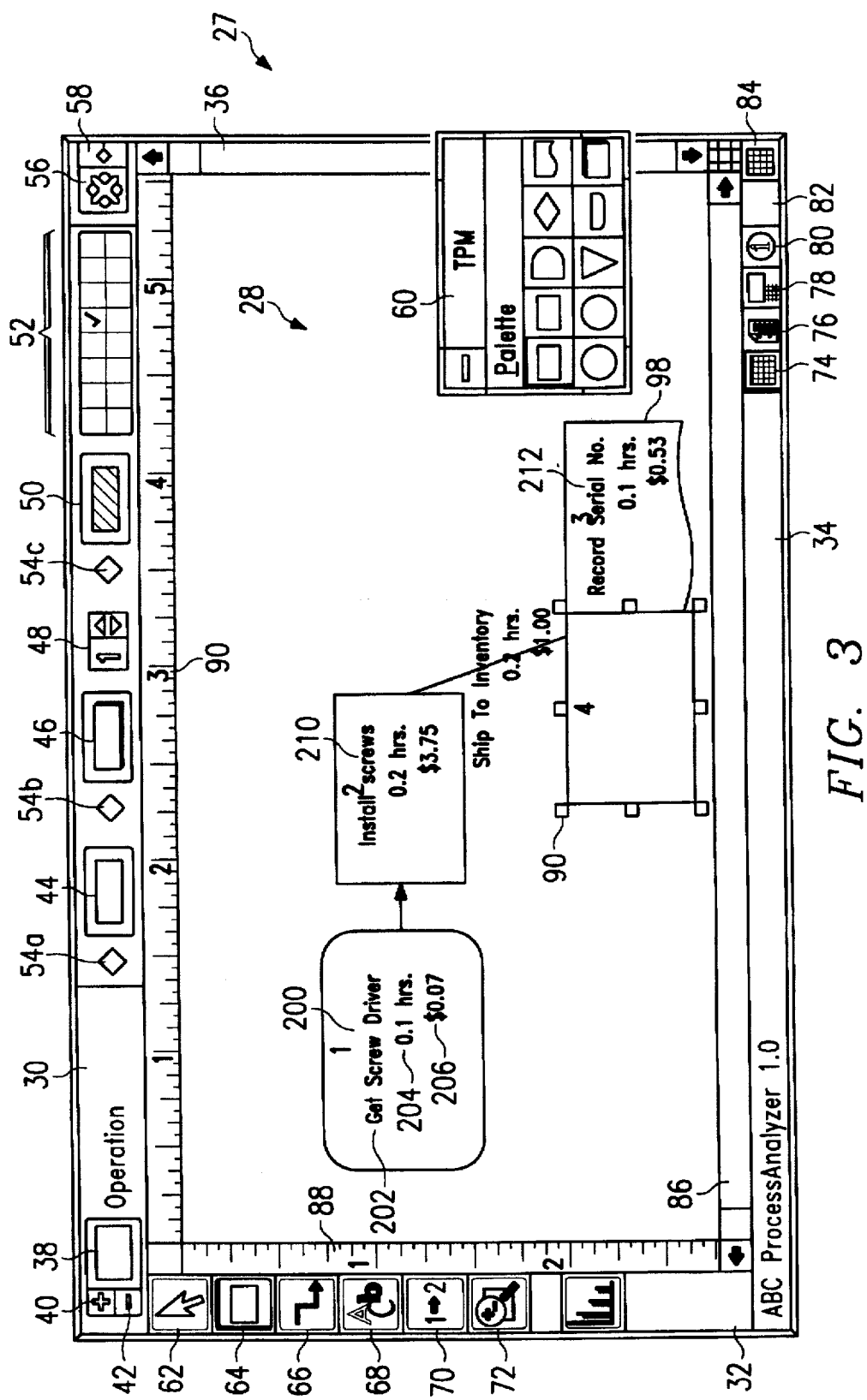

In snap together shapes, shapes in a graphics chart like shapes 1, 2 and 3 in flow chart 28 can be automatically snapped together at a common side. This ensures no overlap of shapes. For example, using snap together shapes with flow chart 28 in FIG. 2, new operation shape 4 shown highlighted with handles 90 can be moved into direct contact with document shape 3. When shape 4 is selected, handles 90 appear. By moving mouse pointer 91 with mouse 18, shape 4 can be moved towards document shape 3 in window 27. While shape 4 is being moved, it is represented by outline shape 4i having centerlines 92 appearing within the interior of shape 4i. Also, while shape 4 is being moved, movement icon 94 is displayed. Once shape 4i is moved to within a predetermined distance of shape 3, side 96 of shape 4i snaps to side 98 of shape 3. When mouse 18 is released, shape 4 snaps to shape 3 at the new common side. This ensures perfect alignment along the common side between shapes 3 and 4 as shown in FIG. 3.

The idea behind snap-together shapes is that when a shape is moved within a chart, the other shapes in the chart are sensed. The system generates a list of all the shapes that are nearby the moving shape and collects those shapes into an array. Then, an iteration through the array is made for each mouse move checking the corners of each shape against the corners of the moving shape. System 10 knows that not every corner can snap to every other corner. For example, the top left corner of the moving shape can only snap to the top right or bottom left corner of another shape. The system finds the closest available shape corner, and if that corner is within a specified distance, the moving shape is snapped to the closest shape when the mouse is released.

Figure 4:
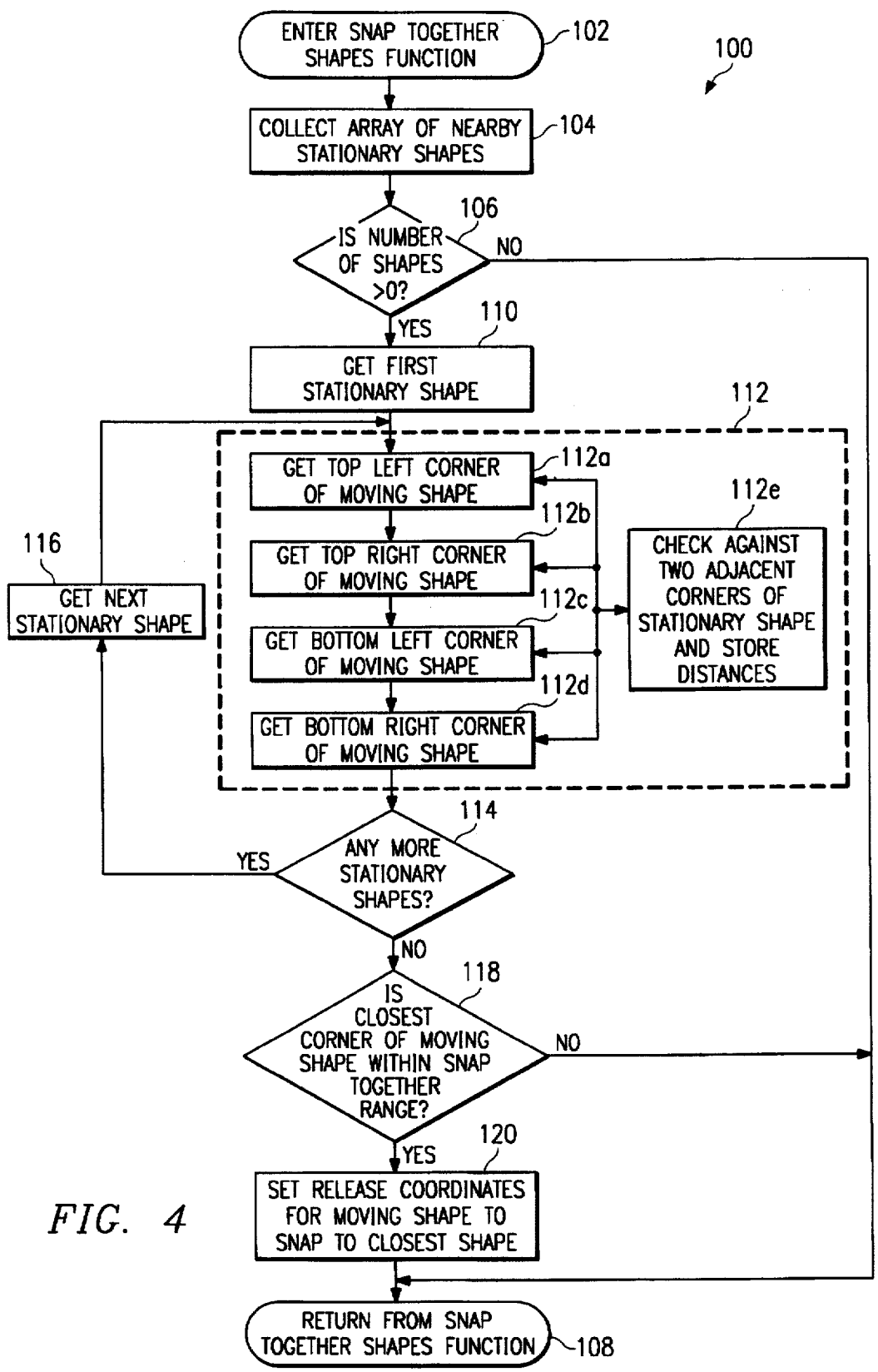
FIG. 4 depicts a flow chart for a snap together shapes operation in accordance with the present invention.

FIG. 4 shows flow chart 100 depicting an exemplary flow for implementing snap together shapes in accordance with the present invention. Snap together shapes is entered at step 102 when mouse 18 is used to select a shape within a window. Continuing with the example of FIG. 2, when shape 4 is selected with mouse 18, handles 90 appear on shape 4 and the program enters snap together shapes function 100. The remaining steps in flow 100 are processed by microprocessor 12 for every subsequent move of mouse 18 while the shape is selected and until the shape is released. At step 104, an array is established of all the shapes in the chart near the selected shape. The array includes the positions for all the stationary shapes in the chart. In FIG. 2, the stationary shapes are shapes 1, 2, 3, and 5.

Continuing with the flow 100 of FIG. 4, a query is made at step 106 as to whether the array of nearby stationary shapes is greater than zero. If the answer to the query at 106 is no, then the present system determines that there are no shapes for the moving shape to snap to and snap together shapes function 100 is exited at step 108.

Alternatively, if the answer to query 106 is that the stationary shape array contains at least one shape, then the flow proceeds to step 110 where the coordinates of the first stationary shape are retrieved. Continuing the flow of chart 100, the top left corner, top right corner, bottom left corner, and bottom right corner of the moving shape are compared against the adjacent corners of the first stationary shape at step 112 (steps 112a through 112e) to determine the spacing between the moving shape and the first stationary shape. The results of the comparison, i.e., the distance between the corners, is stored at step 112e.

Next, at step 114, a query is made as to whether there are additional shapes in the stationary shape array. If the answer is yes, then the flow continues to step 116 where the next stationary shape is retrieved from the stationary shape array, and step 112 is repeated for the next stationary shape. This process continues until, at step 114, it is determined that there are no more stationary shapes in the stationary shape array.

Continuing in flow chart 100 in FIG. 4, next a query is made at step 118 as to whether the closest corner of the moving shape is within a predetermined snap together range for snapping the moving shape to the closest stationary shape. If it is not within snap together range, the flow returns to step 108 where the snap-together shape function is exited and the moving shape is not snapped to the edge of the stationary shape. If the answer at step 118 is yes, then the flow proceeds to step 120 where the release coordinates for the moving shape are set so that when the moving shape is released it snaps to the closest shape. At step 108, snap together shapes function 100 is exited. By this way a shape can be selected and moved within a chart, and when the moving shape comes within a predetermined distance of a stationary shape, the moving shape will snap to the stationary chart so that the two shapes share a common side.

FIG. 3 shows the results following the movement of shape 4 into contact with shape 3 through snap together shapes. As shape 4 moves towards shape 3, the decisions described in flow chart 100 determine when shape 4 is within a predetermined range of shape 3 so that shape 4 should snap together with shape 3 along their common side. For non-rectangular shapes, an imaginary rectangle is created around the moving shape for determining when snapping to the closest stationary shape should occur. For example, when moving a circular shape towards a rectangular shape, an imaginary rectangle is generated around the circular shape so that the determination of when to snap the circle against the rectangle can occur. The result is a circle shape that snaps against a rectangular shape at the common side of the imaginary rectangle for the circular shape and the rectangular shape.

It is noted that once two shapes have been snapped together with the snap together shapes, that it is still possible to resize either of the shapes without changing their common side alignment. This may be accomplished, for example, by grabbing one of handles 90 for shape 4 in FIG. 3 and pulling the handle with the mouse pointer while simultaneously depressing the control (Ctrl) key on keyboard 20. This process allows two shapes that have been snapped together to be modified without changing their common side.

Another technical advantage of the present system is that shapes within a chart can be aligned in the chart without using guidelines or grids. Using shape channel alignment in accordance with the present system, shapes can glide along horizontal and vertical channels and align with other shapes automatically when released. The idea behind channel alignment is that shapes do not align to a background grid, but rather align to the other shapes in the chart.

Figure 5:
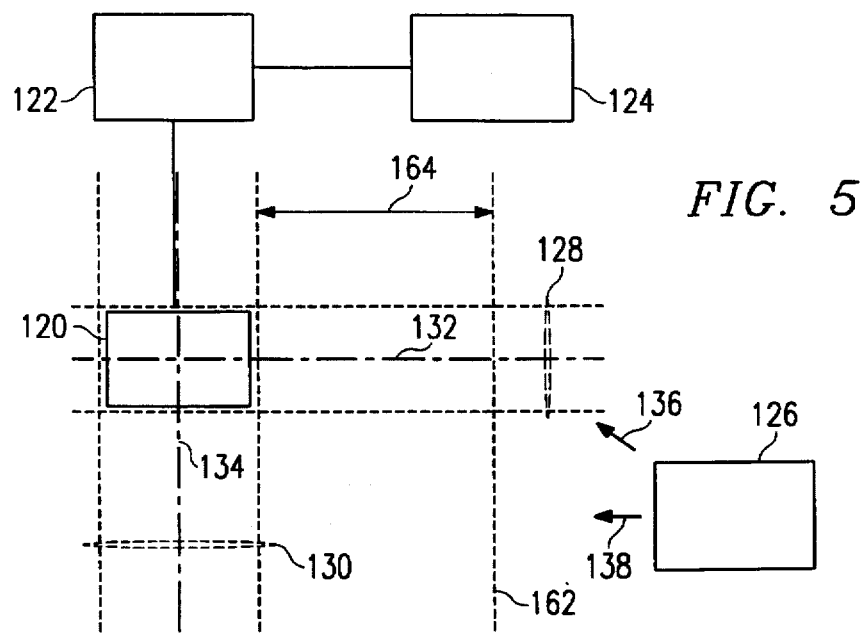
FIG. 5 illustrates imaginary channels used for channel alignment shape placement control in accordance with the present invention.

FIG. 5 illustrates the concept of shape channel alignment in accordance with the present invention. FIG. 5 has four shapes, including shapes 120, 122, 124 and 126. Using shape 120 as the reference shape, the channels that are used for shape channel alignment in accordance with the present invention can be illustrated. Shape 120 has horizontal channel 128 and vertical channel 130. Horizontal channel 128 has horizontal channel centerline 132 while vertical channel 130 has vertical channel centerline 134.

The present system uses the channels extending from a shape for placing shapes in a chart in alignment with one another. It is noted that the channels are not generally shown on display 26, but rather are used by processor 12 in implementing shape channel alignment. Channel alignment uses "magnetic assistance" to detect when a moving shape is within range of a channel of another shape and snaps the moving shape into alignment with the channel. For example, if shape 126 moves upwards in the direction of arrow 136 towards horizontal channel 128 of shape 120, once shape 126 is within horizontal channel 128 it snaps to horizontal channel 128. Similarly, if shape 126 moves in the direction of arrow 138, once shape 126 enters vertical channel 130 of shape 120, it snaps to vertical channel 130. While the operation of shape channel alignment has been described with respect to shape 120, it should be understood that shapes 122 and 124 likewise have vertical and horizontal channels that can be used to snap shape 126 into alignment therewith.

One of the factors in using channel alignment is choosing the shape that the moving shape should align to. The method of choosing the shape to align to may be based on connections. For example, if a first shape is connected to a second shape via a line e.g., shapes 122 and 124 in FIG. 5, then the first shape should align with the channels of the second shape and vice versa. Shape channel alignment facilitates aligning shapes in a flow chart and helps a user generate clean, professional graphics.

Returning to FIG. 2, the novel feature of shape channel alignment with the present invention can be used to align shape 4 with the shapes in flow chart 28. When shape 4 is selected and moved into the vertical channel (not explicitly shown) under shape 1, it will snap to the vertical channel under shape 1. Continuing the movement of shape 4 towards shape 3 will bring shape 4 under shape 2 and into the vertical channel (not explicitly shown) under shape 2. At this point, shape 4 will snap to the vertical channel under shape 2. Once shape 4 is moved close enough to shape 3, then the horizontal channel associated with shape 3 will control the placement of shape 4 with respect to shape 3. Once shape 4 is brought within a predetermined distance of shape 3, then shape channel alignment succumbs to snap together shapes function and shape 4 snaps together with shape 3 along their common side.

Another novel shape placement control feature available with the present invention is shape touch alignment. Shape touch alignment allows the user to use touch selection to align shapes. When a new shape is moved for placement on a chart, the user may "touch" an existing shape with the new shape. The existing shape becomes the reference shape and the new shape automatically aligns to the channels of the referenced shape.

FIG. 2 demonstrates how shape touch alignment can be used to control the placement of two shapes. Once shape 5 has been placed on chart 28, it may be desirable to align shape 5 with, for example, shape 2. In order to use touch alignment of shape 5 with respect to shape 2, shape 5 would be selected with mouse pointer 140. Shape 5 would then be dragged over shape 2 until mouse pointer 140 enters shape 2. Once mouse pointer icon 140 enters shape 2, channel handles 142 appear on shape 2 indicating that it is the reference shape for shape touch alignment. Now, shape 5 can be withdrawn from shape 2 and it will remain in alignment with the channels of shape 2 represented by shape handles 142. It is noted that while shape touch alignment has been described in accordance with shapes 5 and 2 that any of the shapes within chart 28 can be aligned with one another using shape touch alignment.

Figure 6:
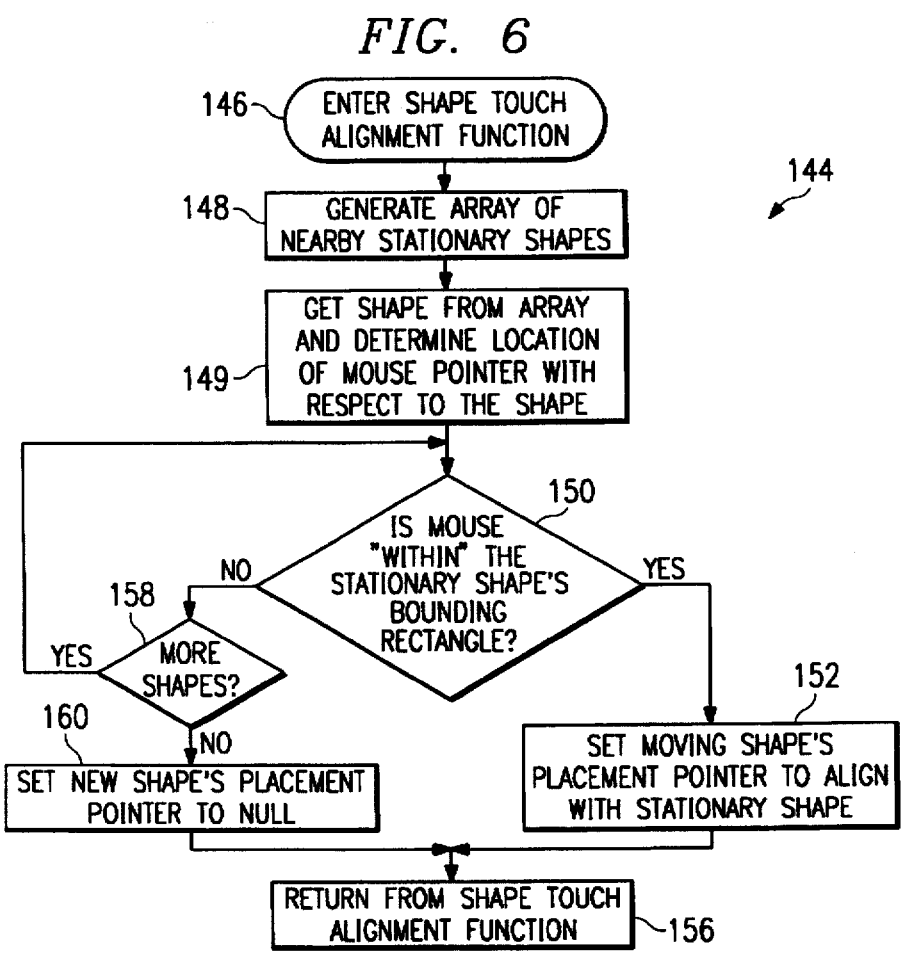
FIG. 6 provides a flow chart for shape touch alignment in accordance with the present invention.

FIG. 6 illustrates shape touch alignment flow chart 144. Shape touch alignment is entered at step 146 after a shape has been selected. Once a shape has been selected every mouse move is analyzed in the remaining steps of flow 144 to determine whether touch alignment of shapes is desired. At step 148, an array of nearby stationary shapes is generated, and at step 149 the first shape is retrieved from the array and analyzed. Processor 12 determines whether the mouse pointer is within the stationary shape. At step 150, a query is made as to whether the mouse pointer, e.g., element 140 in FIG. 2, is within the bounding rectangle of the shape. If it is, then at step 152 the moving shape's placement pointer is set to align with the shape. This ensures that the moving shape will align to the shape when the moving shape is released. Once alignment for the moving shape is determined, then flow 144 can be exited at step 156.

If the answer to the query at step 150 is that the mouse pointer is not within the bounding rectangle of the first shape, the flow proceeds to step 158 where a query is made as to whether there are additional shapes in the stationary shape array. If the answer to the query at step 158 is yes, then the flow proceeds back to step 149 where the next shape in the array is retrieved. This process described is repeated for the next shape at steps 149 and 150 to determine whether shape touch alignment with that shape is appropriate for the moving shape. If at step 158 it is determined that there are no additional shapes in the stationary shape array, then the flow proceeds to step 160 where the new shape's placement pointer is set to "null" so that the new shape does not touch align with any of the existing shapes. Finally, touch alignment function 144 may then be exited at step 156.

By using the shape touch alignment function in accordance with the present invention, shapes can be aligned with one another by simply selecting a shape and moving that shape into contact with another shape. Once the mouse pointer for the moving shape enters the stationary shape, the moving shape will be aligned with the channels associated with the stationary shape when the moving shape is released. This allows a user of the present system to generate clean, professional looking graphics and flow charts.

Another novel shape placement control feature available with the present invention is smart shape spacing. Smart shape spacing allows a user to define how far apart shapes will snap from one another when placed on a chart. Smart shape spacing allows for spacing shapes precisely in a chart without using grids or rulers. For example, if the horizontal smart shape spacing is set at 0.5" and a new shape is dragged out of an existing shape, the new shape will snap to a location approximately 0.5" from the original shape if the mouse button is released near that location.

FIG. 5 can be used to illustrate the concept of smart shape spacing. With smart shape spacing the distance between shapes on a chart can be preset. For example, if shape 126 is moved towards shapes 120, 122, and 124 in the direction of arrow 136, and released at or about the intersection of lines 132 and 162, then shape 126 will be centered at that intersection. This is because the shape spacing for the chart has been set to distance 164 between the edge of shape 120 and line 162. This helps maintain uniform spacing between the shapes in a chart and aids in creating professional, clean graphics.

Returning to FIG. 2 and window 27, smart shape spacing can be used to control the spacing of shape 5 with respect to shape 2. By setting the vertical spacing for the shapes within chart 28, the vertical spacing between shape 5 and shape 2 can be set when shape 5 is dragged away from shape 2. Once shape 5 reaches the approximate preset vertical spacing from shape 2, it will snap to that location. This is visible to the user and by releasing the shape at the snap location, the shape may be placed in the desired location with the appropriate spacing from a reference shape.

Figure 7:
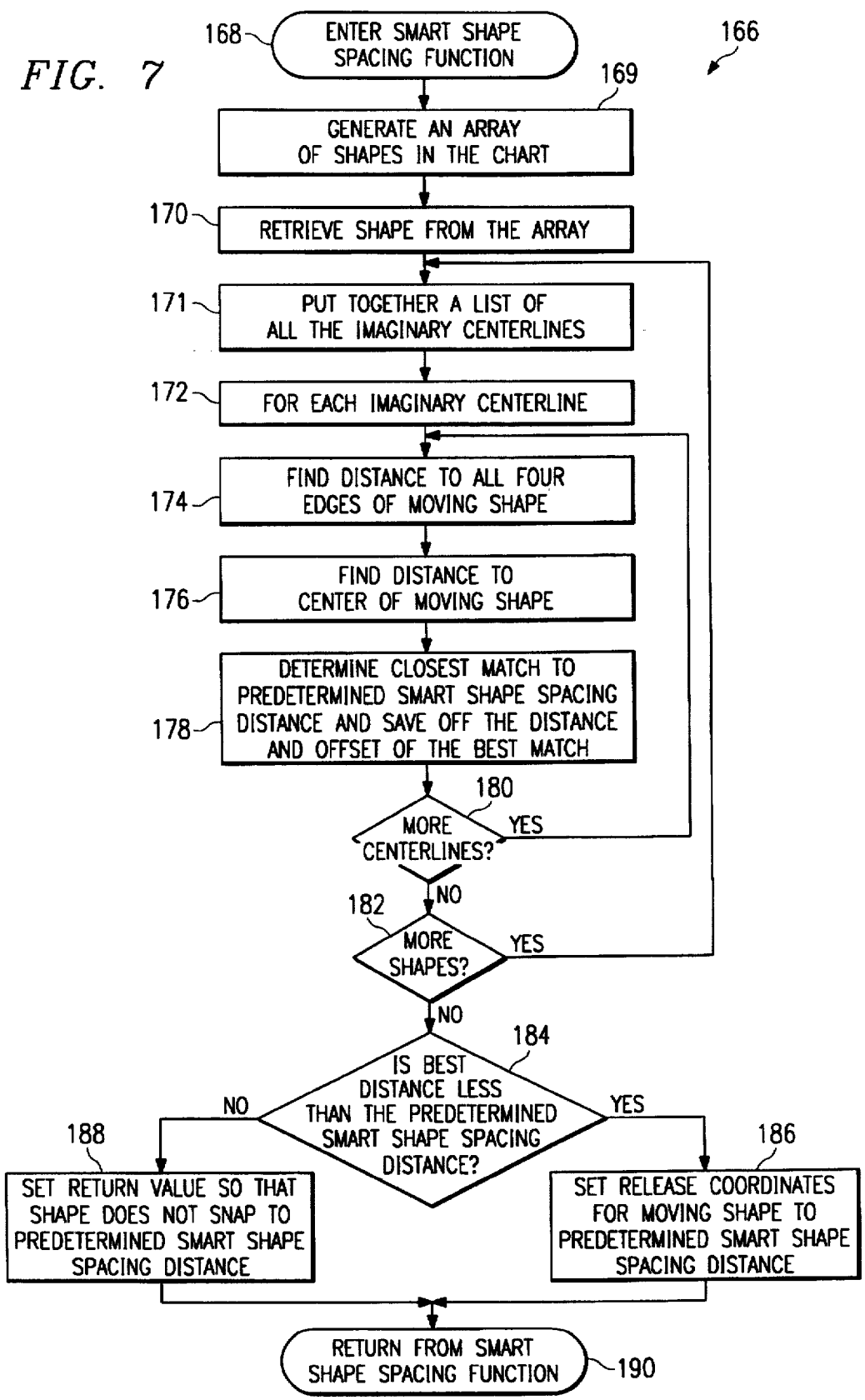
FIG. 7 shows a flow chart for smart shape spacing operation in accordance with the present invention.

FIG. 7 illustrates an exemplary flow for smart shape spacing in flow chart 166 in accordance with the present invention. Smart shape spacing function is entered at step 168 when a shape in a chart or window is selected and moved within the window. The remainder of flow 166 is processed for each subsequent mouse move. It is noted that a user of the present system can preset or select a predetermined distance for the smart shape spacing of shapes within a chart. At step 169, an array of all the shapes on the chart are gathered. At step 170, the first shape in the array is retrieved. At step 171, a list of all the imaginary centerlines, e.g. centerlines 132 and 134 in FIG. 5, for the first shape is generated. Then, at step 172, a comparison of each imaginary centerline to the moving shape is initiated. At step 174, the distance of all four edges of the moving shape to the centerline are determined, and at step 176, the distance to the center of the moving shape to the centerline is determined. At step 178, the best or closest distance to the predetermined smart shape spacing distance, as well as the offset of the best match to the predetermined spacing is determined and saved.

Next, at step 180, a query is made as to whether there are additional centerlines to be analyzed through steps 174 through 178 from the list of imaginary centerlines generated at step 171. If the answer is yes, then the flow returns to steps 174 through 178 where the other centerlines are analyzed against the current position of the moving shape. If the answer to the query at step 180 is no, then flow 166 moves to step 182 where a query is made as to whether there are additional shapes in the shape array generated at step 169. If there are additional shapes, then the flow returns to step 170 where the next shape is analyzed as described. If there are no additional shapes, then the flow goes to step 184 where a query is made as to whether the best distance stored at 178 is less than the predetermined smart shape spacing distance. If the answer is yes, then at step 186 the release coordinates for the moving shape are set to snap to the predetermined smart shape spacing distance. If the best distance is not less than the predetermined smart shape spacing distance, then the flow proceeds to step 188 where the release coordinates for the shape are set to not snap to the predetermined distance. In other words, the shape will simply go to wherever it is released. From step 186 or 188, the smart shape spacing function is exited at step 190.

Using smart shape spacing, a chart can be easily generated having uniform spacing between the shapes in the chart. This allows for creating clean and neat graphics charts.

Figure 8:
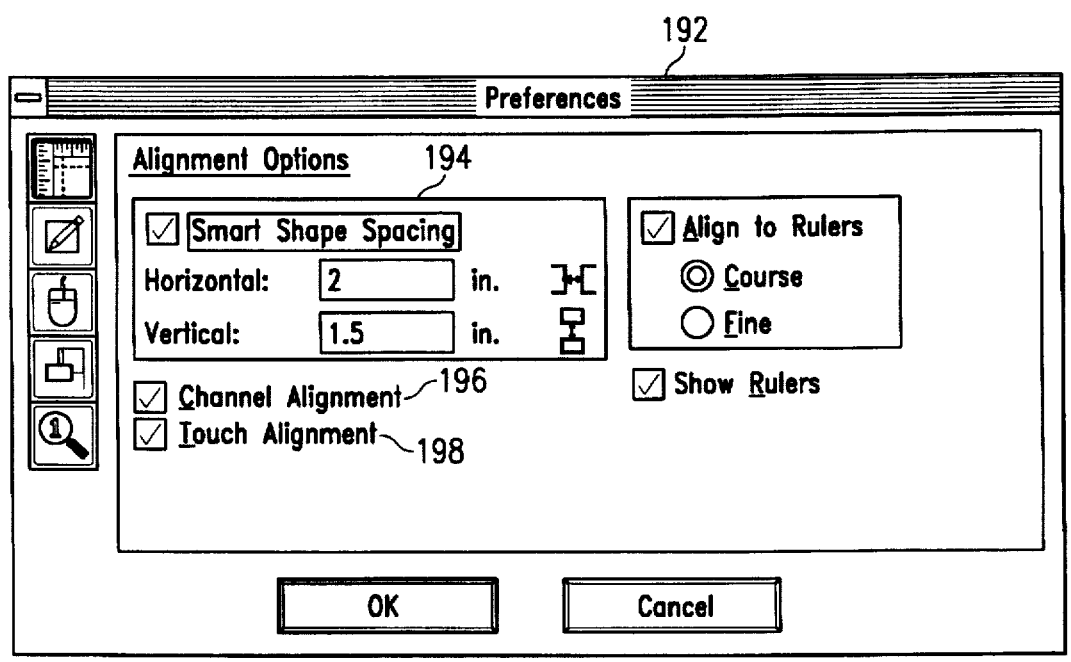
FIG. 8 provides a dialog box for smart shape spacing, shape channel alignment, and shape touch alignment in accordance with the present invention.

FIG. 8 illustrates dialog box 192 for setting the preferences for the shape placement control features in accordance with the present invention. Dialog box 192 includes settings for smart shape spacing 194, channel alignment 196, and touch alignment 198. By selecting and setting these features, the novel functions previously described can be utilized. It is noted that smart shape spacing 194 includes settings for both horizontal and vertical shape spacing. Using the shape placement control features described, e.g., snap together shapes, shape touch alignment, and smart shape spacing, the present system allows a user to quickly and easily generate clean, professional graphics.

The present system provides a method and apparatus for integrating shapes and data into a graphics chart. Data fields in a graphics chart may be helpful in analyzing a process flow or during other re-engineering analysis. By incorporating data fields into a graphics chart, the need for a separate graphics chart and mathematical spreadsheet is eliminated. The graphics that are created in accordance with the present invention may carry with them the necessary data for analyzing process flows or organizations. A key to incorporating data fields into graphics is that the data associated with the graphics, i.e., the shapes and lines within a chart, are carried with the graphics. Additionally, each chart may have a mathematical function that can be used to manipulate the data in the chart. Also, the present invention provides a way for linking the data of several graphics charts with one another.

Window 27 in FIG. 2 containing flow chart 28 provides an example of how data fields may be integrated into a graphics chart in accordance with the present invention. For example, shape 1 has data field 200 including task field 202, man hours field 204, and cost field 206. Shape 2 has data field 210, and shape 3 has data fields 212, both having sub-data fields similar to data fields 200 in shape 1. Line 214 in flow chart 28 also has data field 216 associated with it including sub-data fields like those for the shapes in chart 28. Using the data fields concept of the present invention, data may be entered into a graphics spreadsheet so that the entered data is carried with the shapes and lines of the spreadsheet. While the data of chart 28 in FIG. 2 is also used as the description for the steps of flow chart 28, it is noted that this is not necessarily required. The data can actually be hidden from view or placed outside of their associated shape, as is desired. The importance of the data fields concept is that the data associated with a shape or line is carried along with that shape or line as the shape or line is moved throughout the graphics chart.

Data is entered into a graphics chart by use of a field viewer. A field is created for all the shapes and lines in a chart and any changes made to the field descriptions in the field are applied to all the shapes and lines within the given chart. Each chart has a single field that carries the descriptions of the fields in general, e.g., field name or data type. When data is entered for a shape or line in a chart, it is stored with the shape, and the chart's field is used to format the entered data for entry and display. A field can be stored as a template so that they can be used in other charts.

Figure 9:
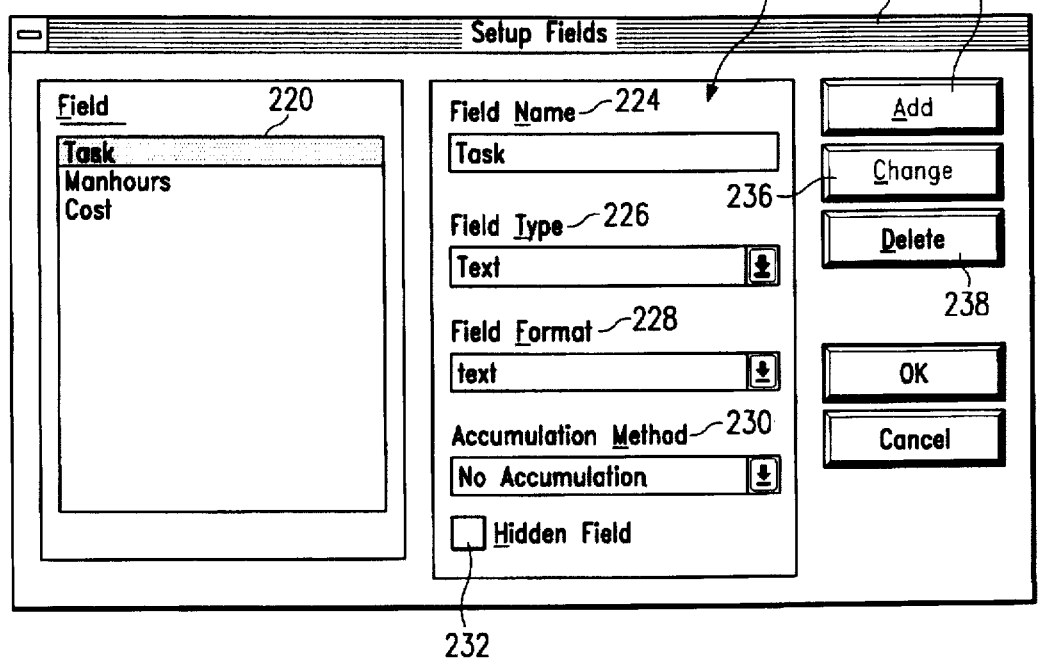
FIG. 9 illustrates a setup fields dialog box that may be used in accordance with the present invention.

FIG. 9 illustrates setup fields dialog box 218 that may be used in accordance with the present invention for generating a data field table for a given chart. In setup fields dialog box 218 are field listings 220 that list the headings for the entries in the field table being created. Field listings 220 in dialog box 218 are those associated with the data fields of flow chart 28 in FIG. 2. Field headings 220 in FIG. 9 include "task," "man hours," and "cost." With "task" highlighted as shown in FIG. 9, field characteristics 222 for the highlighted heading are as shown in FIG. 9. Each field heading has field name 224, field type 226, field format 228, and accumulation method 230. Additionally, the data field can be displayed or hidden on the chart depending on whether hidden field checkbox 232 is selected or not.

Field name 224 is where the name for the data field is entered. Using flow chart 28 as an example, "task" has been entered in field name 224. The actual task can be as shown in FIG. 2, "get screwdriver" data field 202 as is entered and displayed for shape 1 in flow chart 28. Field name 224, therefore, provides a description for the data field. Field type 226 is used to index the set of field formats that are appropriate for the field data. Field type 226 may have several selections including text, duration, date, currency, percent, and number that the user can select.

Field format 228 is related to the selection of field type 226. Field format 228 is used to display the data in the field and validate that the current type of data is being entered. Field format 228 provides the user with several options for the field type selected. For example, if field type 226 is selected to be a duration, then field format 228 would be, for example, days, weeks, months, or years. Field format 228 validates the entry of new data by comparing the entry to the selected format. For example, if field format 228 was set to be months and if the user attempted to enter "0.1," then the system would reject that entry, informing the user that a whole number entry must be made.

Accumulation method 230 is used to indicate to a linked shape how the data for this field should be combined with the similar data in the chart. Accumulation method 230 may have several options, including; no accumulation, sum, mean, median, minimum, maximum, range, count, and non-null count. Accumulation method 230 tells the system how the data in the data fields for all linked shapes should be manipulated. Additionally, the present system can accept mathematical formulas for performing calculations on the data in the data fields.

Adding and deleting data fields from a chart can be accomplished in several ways. First, the desired field can be selected and deleted or, a new field can be created through setups and the selected fields will be added to the table.

Once a given field entry in field listings 220 has had field setup characteristics 222 established, then the field can be added to a chart by selecting add button 234. Alternatively, if the field is only being modified, then the modification to the field in field setup characteristics 222 can be accomplished by selecting change button 236. Changes will then be made to that field. Finally, to delete a field, the field is highlighted in field listings 220 and by selecting delete button 238 the data field will be deleted from field listings 220.

Figure 10:
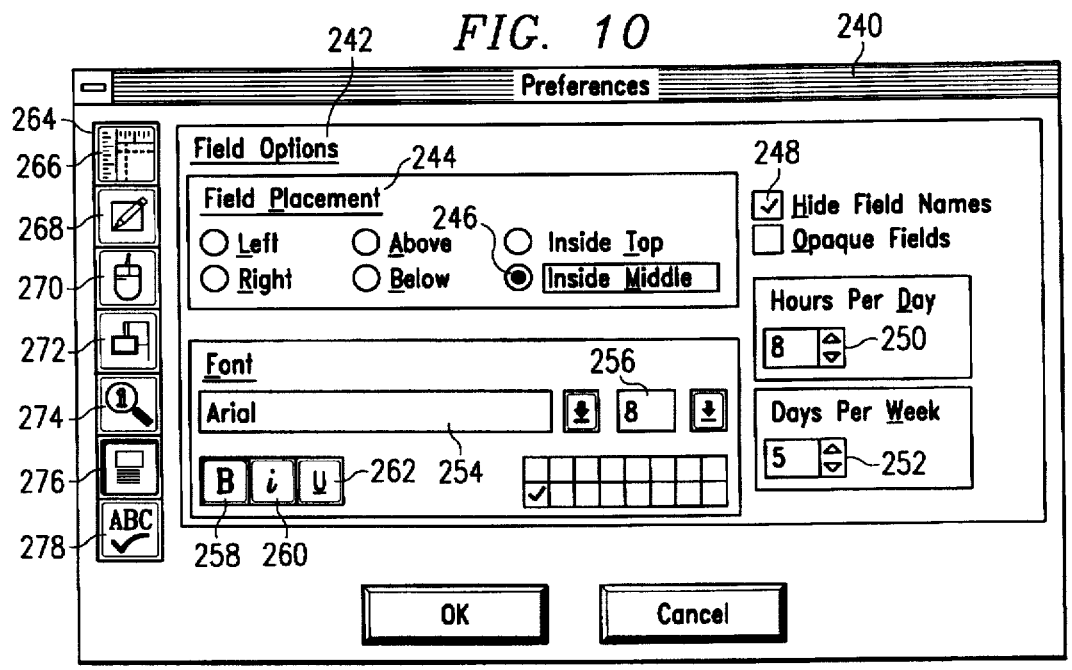
FIG. 10 depicts a field preferences dialog box that may be used to define preferences for data fields on a chart.

FIG. 10 illustrates field preferences dialog box 240 that may be used to define the preferences for the appearance of the data fields on a chart. Field preferences dialog box 240 includes field options 242 that includes field placement 244. Field placement 244 is selected by the user to specify where the data fields should be placed with respect to their associated shape. Field placement 244 in FIG. 10 has been selected so that inside middle selection 246 has been set. Inside middle selection 246 corresponds to the placement of the data fields, e.g. 200, 210, and 212, in flow chart 28 in FIG. 2.

Field options 242 in dialog box 240 also include hide field names checkbox 248, that has been selected and opaque fields checkbox 249 that is not selected in FIG. 10. By selecting hide field names checkbox 248, then field names 224 in field listings 220 in dialog box 218 of FIG. 9 are not displayed in the corresponding chart. Returning to the example of FIG. 2, since hide field names checkbox 248 has been selected, the field names in field listings 220 do not appear with their associated shapes on chart 28.

Field options 242 also include hours per day selection 250 for setting the number of hours to be used in a day. Days per week selection 252 allows the user to select the number of days to be calculated in a week. Field options 242 also provides font selector 254 and font size selector 256 that allow the user to specify the type and size of font respectively to be used in generating the data fields on a chart. Field options 242 also includes bold button 258 that may be selected in order to make the text of the data fields bold. Italic button 260 may be selected to make the text in a data field italicized, and underline button 262 may be used to underline data field text in a chart.

Left preference selection bar 264 in preferences dialogue box 240 provides access to the preferences selections for a number of the features available with the present invention. Alignment button 266 may be selected to review options for the placement of shapes as was previously described in connection with discussions relating to FIGS. 2 through 8.

Shape sizing button 268 is selected to determine the shape sizing option for a chart. Mouse options button 270 is selected to determine whether a double click or a control (Ctrl) key and double click will launch a link to another chart. Line spacing button 272 is selected to set the spacing of lines for a chart. Indicator option button 274 is selected to control the indicators for link launch note and number font. Field options button 276 is selected in order to provide the field options 242 shown in FIG. 10. Spell checking options button 278 is selected to pick a spell checker to be used in performing a spell checking function.

Figure 11:
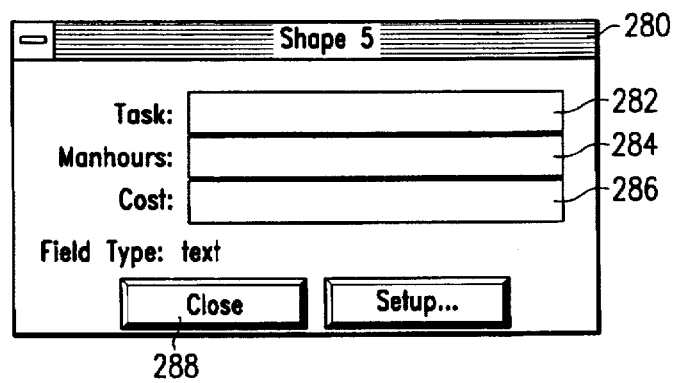
FIG. 11 shows a field table that may be used with the present system to enter data for a shape or a line.

FIG. 11 illustrates field viewer 280 that may be used with the present system to enter data for a shape or line. Field viewer 280 in FIG. 11 is the field viewer for shape 5 in FIG. 2. Field viewer 280 includes task entry 282, manhours entry 284, and cost entry 286. By completing field viewer 280, field data can be added to shape 5 in FIG. 2. It is noted that each shape or line within chart 28 has a field viewer that is similar to field viewer 280. Each shape or line can accept data on a task, manhours, and costs associated with that shape. Once the user has input the field data to the table, field viewer 280 can be closed by selecting button 288.

FIG. 2 illustrates the use of data fields to integrate shapes and data in accordance with the present invention. As previously described, shape 1 has task data field 202 including "Get Screw Driver," manhours data field 204 including "0.1 hrs," and cost data field 206 including "$0.07." Shapes 2 and 3, as well as line 214 also have data fields with similar entries. By integrating the shapes and data into chart 28 in accordance with the present system, a single graphics chart can be created for analyzing the process represented by chart 28. Additionally, chart 28 also includes legend 289 that provides analysis for the data associated with chart 28. By appropriately selecting accumulation method 230 in setup fields box 218, the data in chart 28 will be processed accordingly and presented in legend 289. In the example of chart 28 in FIG. 2, both the "manhours" and "cost" data has been set for summing, so legend 289 shows the summing of the manhour and cost data for chart 28. It is noted that the other accumulation methods previously described can also be used for legend 289. Legend 289 can be hidden from view or moved within chart 28 just like the other shapes in chart 28.

Figure 12:
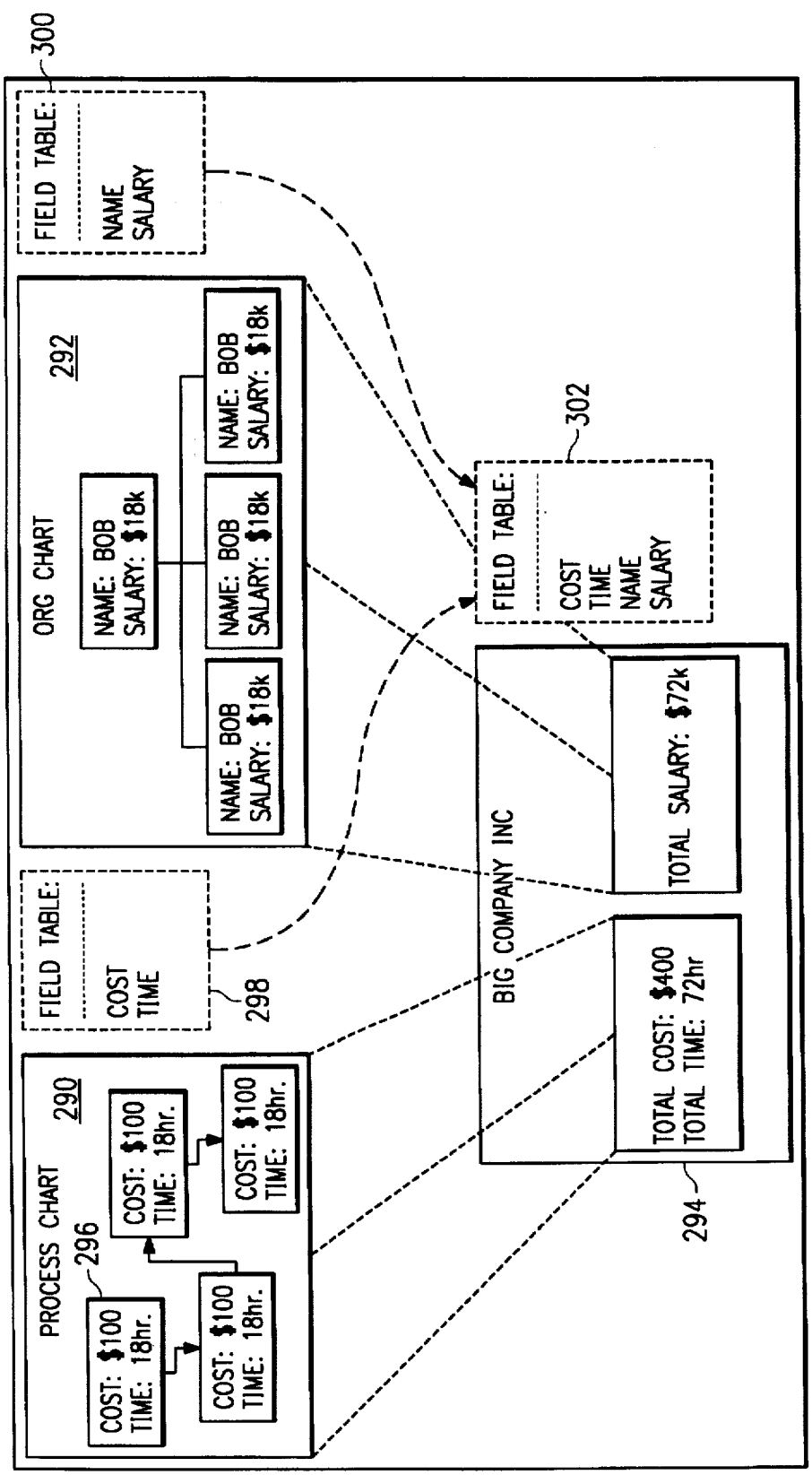
FIG. 12 illustrates the use of data fields with charts that are linked with one another.

FIG. 12 illustrates the use of data fields with charts that are linked to one another. FIG. 12 includes process chart 290, organizational chart 292, and top level chart 294. Process chart 290 has steps 296 each having an associated cost and time data field. Field table 298 for chart 290 accepts the entry of the data for chart 290 as previously described in discussions relating to FIG. 11. Organizational chart 292 includes the names and salaries of the employees of an organization. Field table 300 for organizational chart 292 accepts the name and salary data for the field data associated with organizational chart 292. Top level organizational chart 294 is linked to process chart 290 and organizational chart 292 by methods that are well known in the art. The novelty of the present invention is that the field data for each chart may be carried forward to top level chart 294. Top level chart 294 has field table 302. Field table 302 is automatically updated with the information from field table 298 and field table 300 to provide the appropriate manipulation of data from the separate charts. If accumulation method 230 in FIG. 9 for field table 302 is set for summing, then field table 302 will sum the field data from field table 298 and field table 300 as the data is brought forward to field table 302. This is the example shown in FIG. 12. By this way the data from several charts can be combined into a single top-level chart. Also, if the field data within any of the lower level charts is changed, the changes are automatically reflected in top-level field table chart 302.

The present invention also provides the capability to generate output reports for the data associated with a given chart. The present system provides for three types of reports. The first is the input report that provides a list of all shapes in a chart each followed by the lines coming into them. The second is the output data report that provides a list of shapes in a chart with each followed by the lines leaving them. The third report is the metric report that provides a list of all data for all shapes and the lines for the shapes. Present system may supply the reports to a printer, file, or clipboard.

Figure 13:
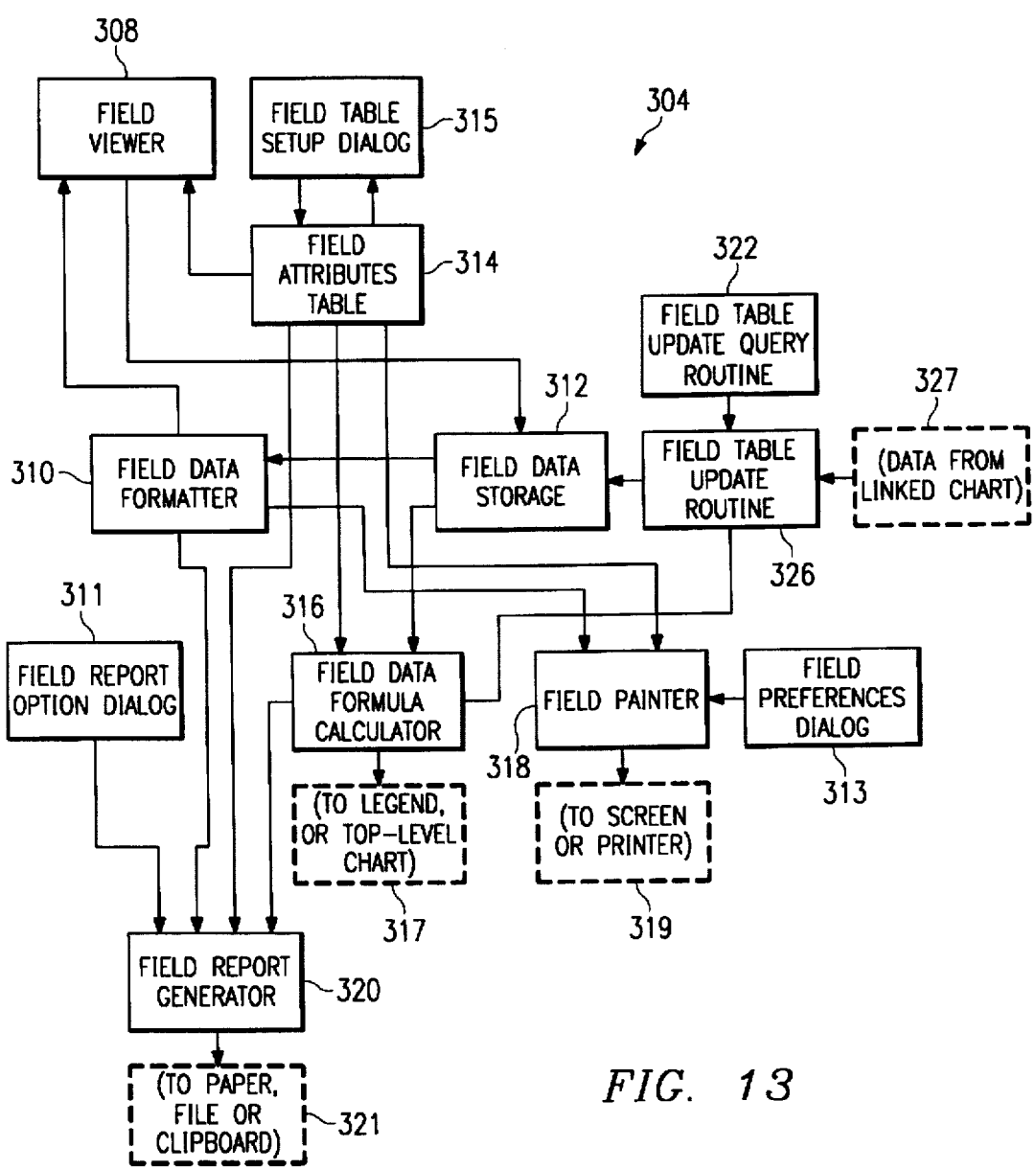
FIG. 13 shows a data fields data flow diagram in accordance with the present invention.

FIG. 13 illustrates data fields data flow diagram 304 in accordance with the present invention. Data fields data flow diagram 304 includes several functions that make up data fields function 306. The dependencies of the functions are represented by the arrows between the functions in data flow diagram 304. Beginning with field attributes table function 314 of data fields data flow diagram 304, this function provides for opening a chart, to get the first object's field data block pointer, to get the next object's field data block pointer, to close a chart, and stores field attribute data for each field in the chart. The field attribute data can include, as previously described, field name, field type, formula, flags, and a unique identification. Field attributes table function 314 assigns a unique identification to the data fields for tracking the stored field data. Field attributes table function 314 provides a function for adding new data field entries, for retrieving data field entries, for modifying data field entries, for deleting data field entries, for reading data fields from a chart file, for writing data fields to a chart file, to create a duplicate copy of data fields for inclusion in a new chart, and to merge a second data field table into a first with reassigned identifications for each incoming entry. Field attributes table function 314 also provides header control structure, data field entry structure, and an array of data field entry structures.

Field viewer function 308 generates a field viewer dialogue box, e.g., field viewer 280 in FIG. 11, for receiving field data for a chart. Field table setup dialogue function 315 presents the user with a dialogue box for generating the data fields for a chart, e.g., setup fields dialogue box 218 in FIG. 9. Field data formatter function 310 validates the entry of data field data input at field viewer function 308. Data formatter function 310 also formats the data for storage.

Field data storage system function 312 provides for the packing and unpacking of field data for storage with a shape. Field data storage system function 312 also provides for storing and retrieving fields in any order to allow the user of the present system to rearrange the order of the fields at any time. Field data storage function 312 provides a unique field for each chart's field table. Field data storage function 312 allows for the creation of new data blocks, to add to existing data blocks, to retrieve data from data blocks by type, to delete data blocks, to write data blocks to a disk file or other data storage device, and to read data blocks from a disk file or other data storage device.

Field data formula calculator function 316 collects data from a chart, applies the calculation and returns the result to a field data block in the charts legend or to a top-level chart as represented by element 317 in FIG. 13. Field data formula calculator function 316 is used in both chart linking and field reporting. Field painter function 318 provides for the generation of a chart with data fields on display 26 or printer 22. Field painter function 318 generates the chart in accordance with the preferences set by the user with field preferences dialogue function 313. Field painter function 316 places data fields relative to shapes according to the current field preference settings. Field painter function 318 creates the field name, a colon, and the formatted data as shown for the data fields included in FIG. 2. Field painter function 318 provides the function to create all fields for a shape, to paint one field at the X,Y coordinates, to calculate the full size of field block, and to clear data from a screen so that a chart can be redrawn. Field data painter function 318 outputs the field data to an appropriate screen or printer driver represented by element 319 in FIG. 13.

Field report option dialogue function 311 presents a dialogue box to the user for generating a report from the data in a chart. Field report generator function 320 generates the requested report and presents the report to paper, a file, or clipboard, as represented by element 321 in FIG. 13. For a given report, field report generator function 320 prints column headers with field names followed by rows of data and also uses formula to provide a total at the end of the report. For a file report, field report generator function 320 presents the user with a file/save dialogue box, and writes out data in a tab-delimitated format that is compatible with standard spreadsheet formats. For a clipboard field report, field report generator function 320 stores data in textual tab-delimitated format on the clipboard.

Field data update query routine function 322 provides the user with a message box with the option to update data on linked charts as the charts are opened or to delay updating. Field table update routine function 336 provides the functionality for collecting the data associated with several charts to the top level or link chart as was described in discussions relating to FIG. 12. Field data update routine function 326 also calls the field data update routine as necessary to update the field data of several linked charts represented by element 327 in FIG. 13.

Field viewer function 324 provides for displaying data fields in a chart depending on the selection of the hidden field checkbox 232 in dialogue box 218.

It is noted that the functions shown and described with respect to FIG. 13 are exemplary only. The present system provides a method and system for integrating graphical shapes with data. With this system, graphics charts can be created having the benefits of mathematical spreadsheets.

The present system provides a tool that lets a user create a cause-and-effect diagram. Cause-and-effect diagrams are sometimes referred to as Ishikawa or fish bone diagrams, and may be used for gathering, sorting and relating information. These diagrams can be used to relate causes and effects and to determine their levels of influence upon one another. Cause-and-effect diagrams are used primarily during cause analysis. In general, an effect or product is identified. This effect becomes the "head" of the "fish." A "backbone" or "spine" is drawn and individual "bones" are attached to the backbone. These "bones" represent the various major causes that bring about the effect.

Additional "bones" may be added at a first level to depict subcauses. Several subcause levels may be added until enough detail for the identified causes has been reached. The same cause can be repeated in a cause-and-effect diagram if appropriate. The ultimate goal is to have a complete list of causes and subcauses that give rise to the effect being analyzed.

Cause analysis is usually a negative process and is performed to determine what went wrong. It is particularly well suited for use during brainstorming sessions, which is the most widely used application of cause-and-effect diagrams. Typically, cause-and-effect diagrams are generated by pencil and paper. Manual generation of cause-and-effect diagrams has obvious limitations. As the cause-and-effect diagram develops, it becomes more difficult to modify and change. Some prior computer aided systems have used standard graphics programs to create cause-and-effect diagrams. Unfortunately, the use of these graphics programs to generate cause-and-effect diagrams has associated with it all the troubles and complexities of using a graphics program. The user may become frustrated with the complexities of the computer system and return to the paper and pencil system.

The present system offers a process analysis feature that lets the user create cause-and-effect diagrams for gathering, sorting, and relating information. These diagrams can be used to relate causes and effects to determine their levels of influence.

Figure 14:
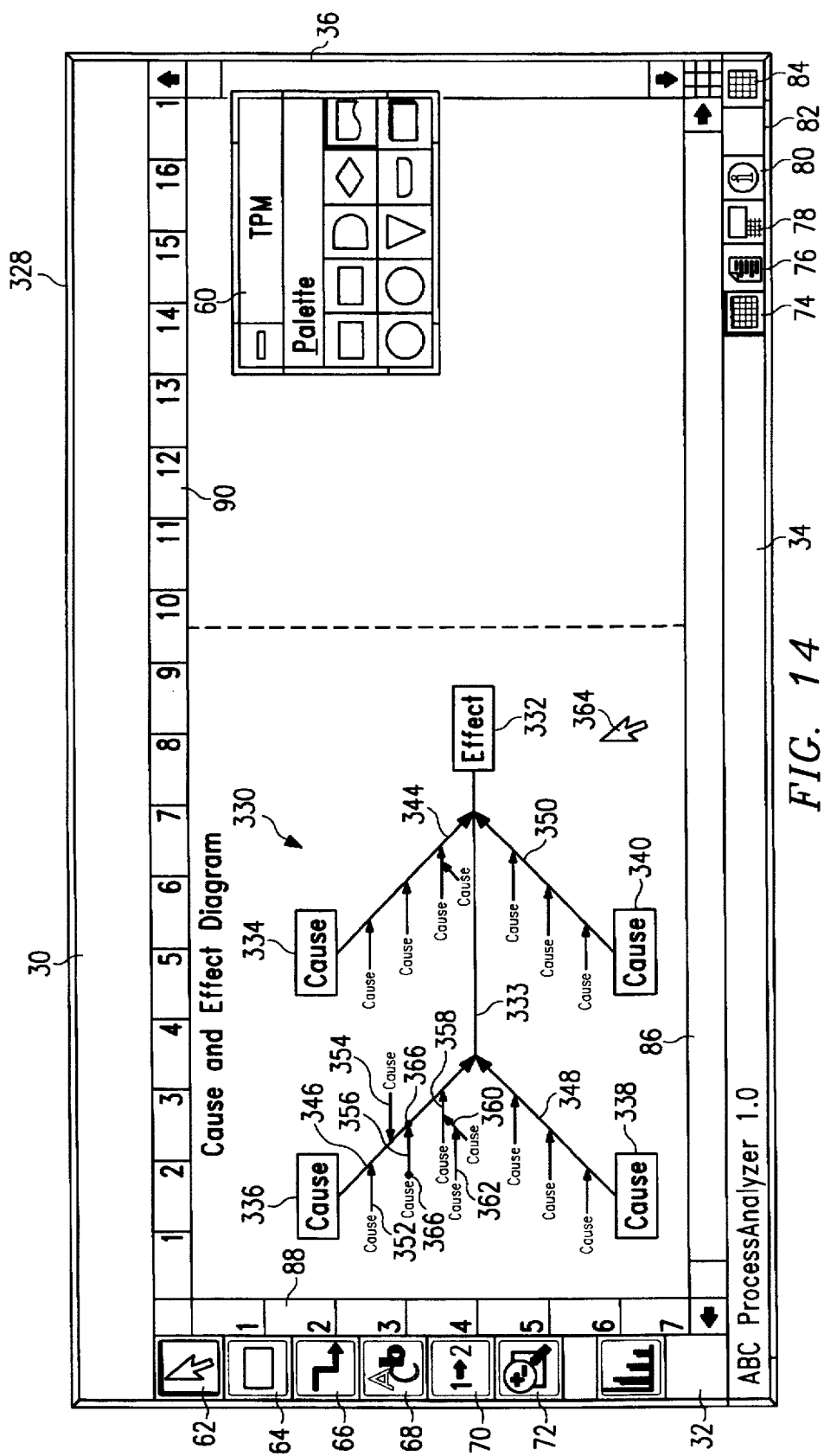
FIG. 14 illustrates an exemplary cause-and-effect diagram generated in accordance with the present invention.

FIG. 14 illustrates window 328 having cause-and-effect diagram 330 therein. Cause-and-effect diagram 330 has effect placeholder 332, backbone 333, and four main causes, including main cause 334, 336, 338, and 340. Cause line 344 runs from cause 334 to backbone 333, cause line 346 runs between cause 336 and backbone 333, cause line 348 runs between cause 338 and backbone 333, and cause line 350 runs between cause 340 and backbone 333. It is noted that the present system is not limited to generating cause-and-effect diagrams having the number of causes shown in FIG. 14.

Each of the cause lines in chart 330 of FIG. 14 has several subcauses that includes a line and text. For example, cause line 346 has subcauses 352, 354, 356, and 358. Additionally, subcause 358 has subcause 360, and subcause 360 has subcause 362. Using cause-and-effect analysis, diagram 330 shows that cause 336 has four subcauses associated with it. Subcause 358 has associated subcause 360 and subcause 360 has associated subcause 362 associated. Using a cause-and-effect diagram like chart 330 in FIG. 14, the causes and subcauses that result in a given effect may be presented in graphical form so that their relationship with one another is clearly shown. Using a cause-and-effect diagram, the problems or causes that result in a negative effect can be separated from one another and analyzed individually. This helps break down a process and helps the user of the present system identify where to focus their efforts to eliminate causes that result in a negative effect.

The present system can provide a template to the user that includes chart 330 in FIG. 14. Whereas previously developed systems for generating cause and effect diagrams required the user to enter the data for the diagram into a grid and then generated the diagram from the data, the present system allows the user to directly create a cause and effect diagram in a graphics window on a computer screen. The user of the present system can then fill in diagram 330 with the effects and causes particular to the system being analyzed. Cause-and-effect chart 330 of FIG. 14 can be modified as necessary to create a custom cause-and-effect diagram. In order to move one of the lines within chart 330, mouse pointer 364 should be positioned over the center of the line. With the mouse pointer centered over the line, the left mouse button should be clicked, thereby grabbing the line. While holding the mouse button down and moving mouse pointer 364, the line will be moved. By this way, any of the cause or subcause lines in chart 330 can be moved. Additionally, any of the lines in chart 330 can be deleted. For example, mouse pointer 364 can be used to select line 356. When line 356 is selected, handles 366 appear. This lets the user know that line 356 has been selected. By pressing the delete key on keyboard 20, the user can delete line 356.

It may also be necessary to add a line to cause-and-effect diagram 330. This can be accomplished by selecting a line with mouse pointer 364, simultaneously depressing the shift key or keyboard 20, and dragging from the line's center. When the present system receives this command, it creates a duplicate line.

The causes and effects in chart 330 may also be customized as desired for the user. For example, the text in effect box 332 can be modified by simply selecting the box and retyping the desired title. Therefore, if the effect to be analyzed was "Low Productivity," then the word "effect" in block 332 can be selected and "Low Productivity" would be typed into box 332. The same process may be used to change the text in cause boxes 334 through 340. Also, the text at the end of each subcause line can be replaced with customized text. This is accomplished simply by selecting the text with mouse pointer 364 and then typing in the new text.

Additionally, while the present system may present the user with a template for generating a cause-and-effect diagram, the user is not limited to using a template. System 10 provides a user friendly system for generating cause-and-effect diagrams. A user can use a template, like the one shown in chart 330 of FIG. 14 or can generate a cause-and-effect diagram from a blank chart.

Figure 15:
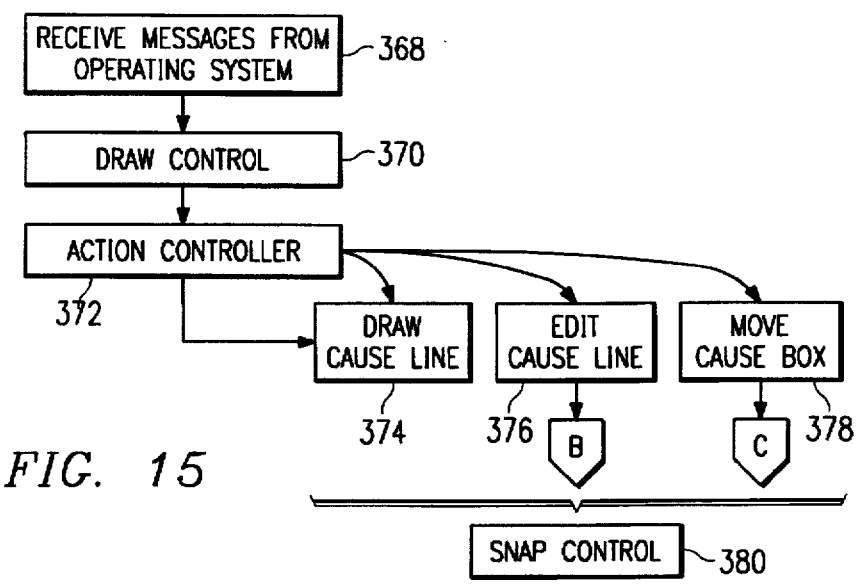
FIG. 15 shows a top-level flow chart for the present computer system for generating cause-and-effect diagrams.

FIG. 15 illustrates a top level flow chart for the present computer system for generating cause-and-effect diagrams. This flow chart will be used in describing several of the functions that are implemented by the present system in creating and editing cause-and-effect diagrams like diagram 330 in FIG. 14.

The present system receives messages from the computers operating system at step 368. As previously noted, computer system 10 can be run with many types of operating systems. As the user moves within a document, i.e., moves mouse 18 or keys up or keys down on keyboard 20, the operating system responds to these movements and creates messages that it sends to microprocessor 12 of system 10 at step 368. It is noted that this process occurs for every movement of mouse 18 and every input to keyboard 20.

One of the messages that the operating system can generate would be in response to the user indicating that he or she wishes to draw a line or shape. At step 370 in FIG. 15, the present system reacts to such a message by entering draw control mode 370 of the present system. Under draw control mode 370, the user can draw a line, edit a line, or move an object in the diagram or chart. Again, the type of action desired by the user is entered through mouse and keyboard control.

At step 372, mouse 18 or keyboard 20 messages are received by action controller 372, which interprets the operating system messages and determines which function should be performed. Action controller step 372 can initiate several functions in response to the message received from the operating system. Three of the functions that may be accessed in the present system include draw cause line 374, edit cause line 376, and move cause box 378. Once an action is created, every mouse move causes a flow from step 368 through step 372 into one of the functions represented by functions 376 and 378. The functions respond to these operating system messages in performing the action desired by the user. It is noted that functions 374, 376, and 378 in FIG. 15 are exemplary only of the types of functions that the present system performs.

Snap control function 380 is an overall controller or lookup table that maintains the relationship of shapes and lines within a cause-and-effect diagram, such as lines 342, 344, 346, 348 and 350 and shapes 334 through 340 in diagram 330 of FIG. 14. Snap control also keeps control of the relationships of lines with one another, for example, cause line 346 and subcause lines 350, 360, and 362. As previously described, with the present system, lines and shapes can automatically snap to one another. Snap control function 380 keeps a list of which lines and shapes are snapped to one another. Snap control function 380 maintains the relationship of all the lines and shapes within a diagram so that any change to one of the lines is reflected in its related or associated lines. Snap control 380 maintains a list for each line and shape in a chart and its relationship to every other shape in the chart. As an example, when using snap control 380, moving line 358 would cause lines 356 and 362 that are related to line 358 to also move.

One of the advantages of the present system is that it provides for automatic alignment of shapes and lines with one another so that clean, clear cause-and-effect diagrams can be generated. One of the important features of the present system is its ability to keep track of the orientation of all the lines and shapes within a chart and to align those lines and shapes in a logical manner.

Figure 16:
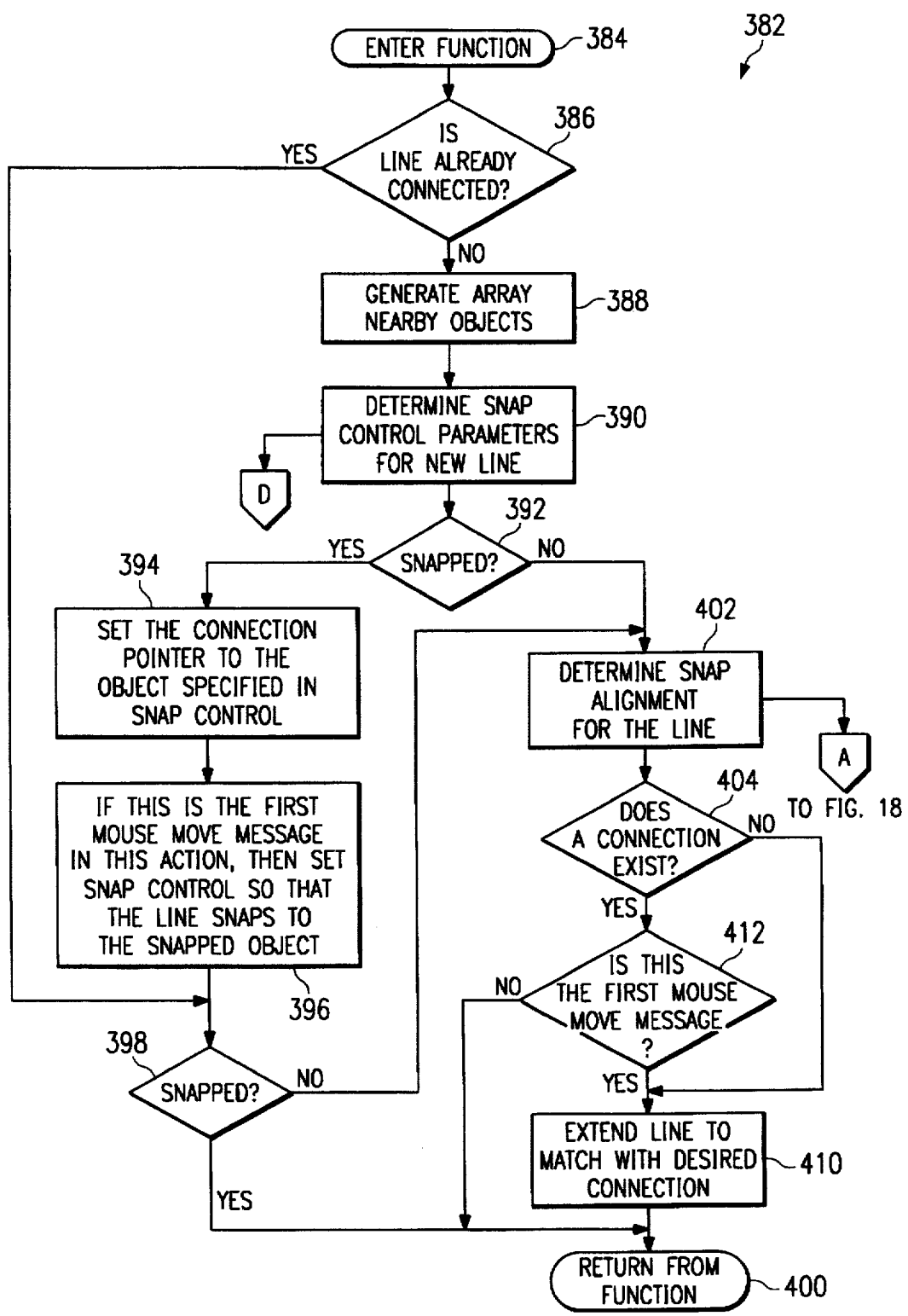
FIG. 16 depicts a flow chart for an alignment function used in accordance with the present invention.

FIG. 16 is a flow chart for the alignment function used in accordance with the present invention. Alignment function 382 is entered at step 384 whenever action controller 372 determines that a new line has been added to a cause-and-effect chart and that the new line must be aligned with existing lines or shapes within a chart. As previously stated, once this function is entered, every mouse move message is processed through the flow chart in FIG. 16.

Before entering alignment function 382, the new line has been created in the chart by the user. The line may be represented by at least two points. Additionally, the current mouse location is known, and the snap control for the chart has been established. As previously stated, the existing lines and shapes in the chart, as well as the location and length of the new line is maintained in snap control 380 so that the present system can maintain a logical orientation and relationship for the lines within a chart.

With the new line selected, every mouse move is analyzed. Once the function is entered at step 384, a query is made at step 386 as to whether the new line that has been added to the chart is already connected to a shape or existing line within the chart. If the answer to the query at step 386 is no, then the flow proceeds to step 388, where the system generates an array of nearby objects, both shapes and lines within the chart. Step 388 creates a list of all the lines and shapes in the chart to which it may be possible to align the new line to.

Once the array of nearby objects is set at step 388, the flow proceeds to step 390 where snap control parameters for the new line are determined. Additional detail on the determination of snap control parameters will be described hereinafter with respect to discussions relating to FIG. 17.

Once the snap control parameters are determined at step 390, the flow proceeds to step 392 where a query is made as to whether the new line is snapped to an existing line or object in the chart. If the answer to the query at step 392 is yes, then at step 394 the connection pointer for the new line with respect to its snapped object is as specified in snap control 380. By this way, if a new subcause line is to be snapped to an existing cause line, then the pointer for the new line is set in snap automatically to the existing cause line. Next, at step 396, if this is the first mouse move then snap control 380 is set so that the new line snaps to the destination shape on line. Next, the flow proceeds to step 398 where a query is made as to whether the new line or shape is snapped. If the answer is yes, then the alignment of the new line or shape is completed and alignment function 382 can be exited at step 400. If the answer to the query at step 398 is no, then the new line is not snapped, and the flow proceeds to determine snap alignment for the line at step 402.

Determine snap alignment for the line step 402 is entered when either the query at step 392 or step 398 is that the new line is not snapped. Additional detail on step 402 will be provided hereinafter in discussions relating to FIG. 18. Basically, step 402 determines the alignment for the new line when it snaps to an existing line or object. Once the snap alignment for an object has been determined at step 402, alignment function 382 proceeds to step 404. At step 404, a query is made as to whether a connection exists between the new line and an existing shape or line within the chart. If the answer is no at step 404, then the flow proceeds to step 410, where the system will extend the line to match with the desired connection. By this way, if the new line is released prior to being connected to an existing line, the new line will be extended in length to match with the desired connection as determined at step 402. Once the new line has been matched with the desired connection at step 410, the flow proceeds to step 400 where the alignment function is exited.

Returning to step 404, if a connection does exist for the new line, then the flow proceeds to step 412, where a query is made as to whether this is the first mouse move message. If the answer at step 412 is yes, then the flow proceeds back to step 410, where the line is extended to match with the desired connection. If the answer at step 412 is no, then the system knows that the new line has been attached to an existing line or shape and is in proper alignment so that the alignment function can be exited at step 400. By this way a new line can be appropriately aligned with the existing lines or shapes in a chart.

Figure 17:
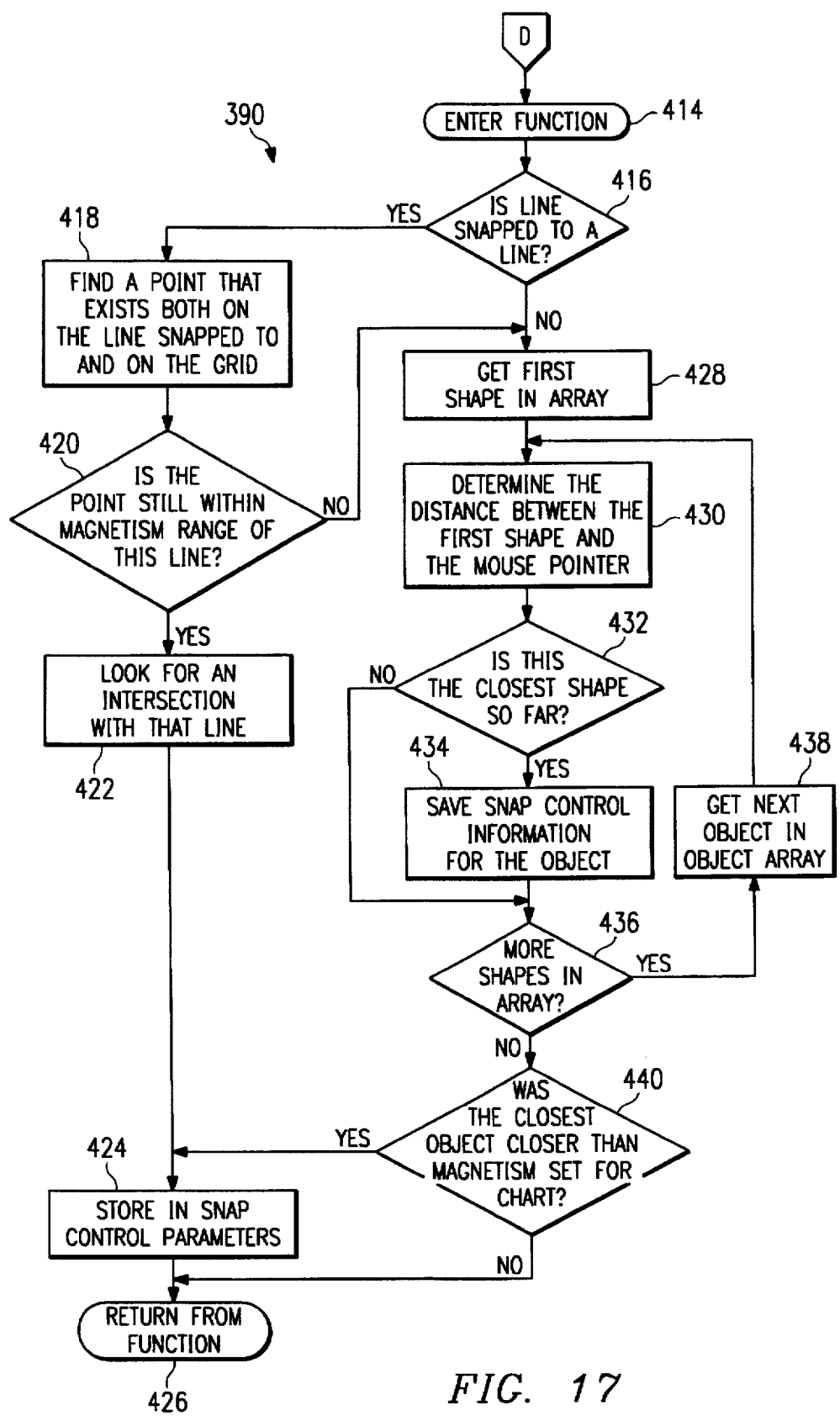
FIG. 17 is a flow chart for determining snap control parameters for snapping a line to a point in accordance with the present invention.

FIG. 17 provides additional detail for determining snap control parameters step 390 from FIG. 16 for snapping a line to a point. Flow 390 determines the snap control parameters for a line so that when a new line is released by the user it snaps to an existing line or shape within the chart. Determine snap control parameters step 390 is entered at step 414. When flow 390 is entered at step 414, several of the parameters necessary for making this determination have been previously established. For instance, an array of nearby shapes or lines to the moving line has already been collected. Additionally, as previously described, the "magnetism" to be used in aligning shapes and lines with one another is set.

The flow then proceeds to step 416 where a query is made as to whether the line in question is already snapped to a line. If the answer is yes, then the flow proceeds to step 418 where a point that exists both on the line snapped to and on the background grid of the chart is determined. Next, a query is made at step 420 as to whether the point located at step 418 is still within the magnetism range of the line being moved. If the answer to the query at step 420 is yes, then the flow proceeds to step 422 where the system determines an intersection for the moving line with that line. When doing this, the system does not just look for the closest point, but rather looks for a way to extend the moving line without losing the angle of the line. Next, once step 422 is completed, the appropriate entries for snap control 380 are stored at step 424. Determine snap control parameters step 390 can then be exited at step 426.

Returning to the query at step 416, if the line has not yet snapped to another line or shape, then the flow proceeds to step 428, where the first shape in the shape array is retrieved. Then at step 430, the system determines a distance between the first shape and the mouse pointer. At step 432, a query is made as to whether the shape is the closest shape so far. If it is, then the information for that shape is saved at step 434. If the answer at the query at step 432 is no, then the flow proceeds directly to step 436.

At step 436 a query is made as to whether there are more shapes in the array. If the answer is yes, then the flow proceeds to step 438, where the information for the next shape in the array is retrieved and steps 430 through 434 are repeated until all the shapes in the array have been analyzed.

Once all the objects in the array have been analyzed the flow proceeds to step 440. At step 440, a query is made as to whether the closest shape was closer than the magnetism set for this chart. If the answer is yes, then the flow proceeds to step 424, where information for snapping the line to the closest shape are stored in snap control 380. If the answer at step 440 is no, then the flow proceeds to step 426 and function 390 is exited.

Figure 18:
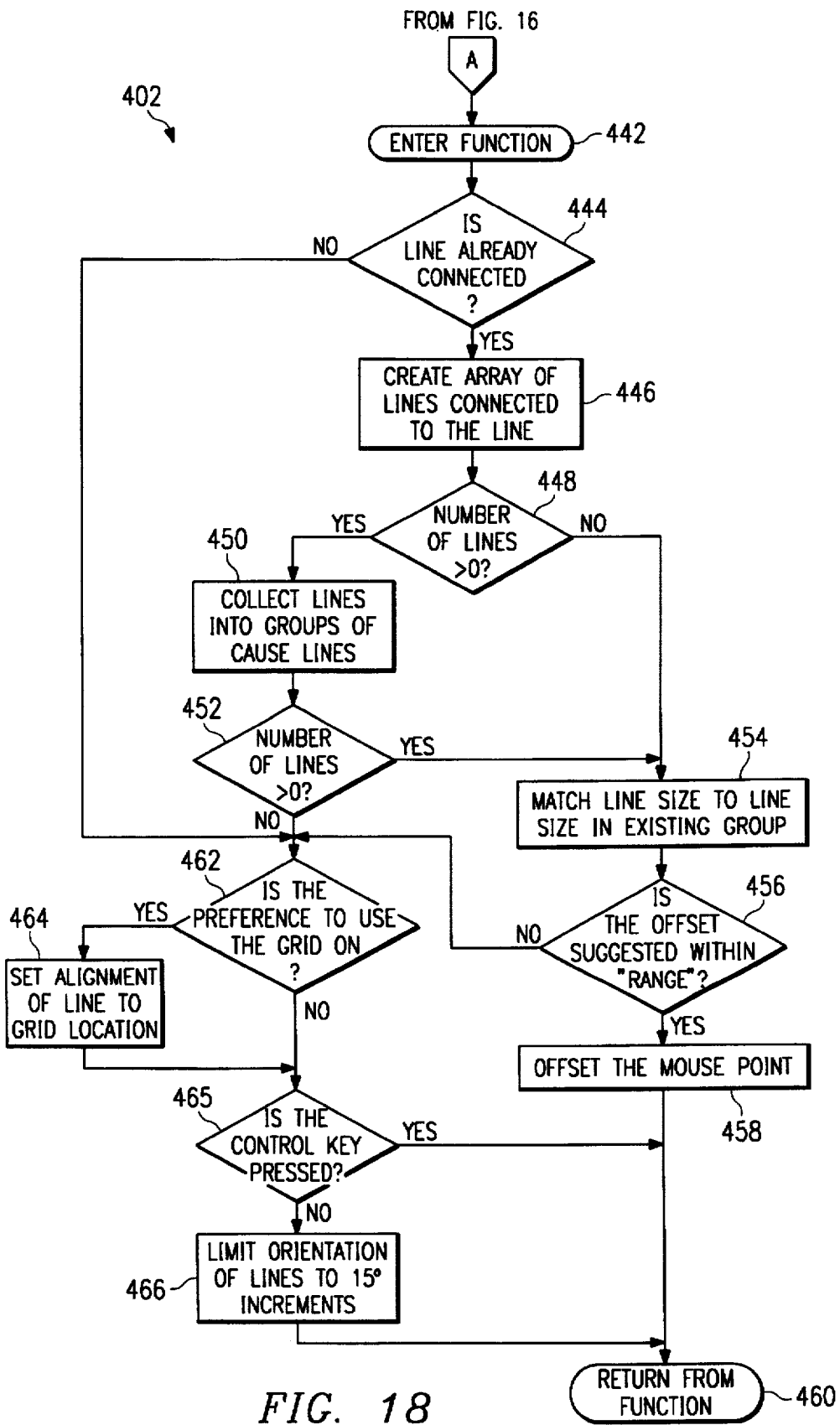
FIG. 18 shows a flow chart for shape snap alignment in accordance with the present invention.

FIG. 18 provides additional detail on determine snap alignment for the line step 402 in FIG. 16. Function 402 is used to align a line with the other lines in the chart when the line is edited. Function 402 is entered at step 442 once the location for the line being edited and the location of the mouse have been determined. From step 442, a query is made at step 444 as to whether the line being edited is already connected to another line in the chart. If the answer is yes, then the flow proceeds to step 446 where an array of lines connected to the edited line is generated. Next, at step 448, a query is made as to whether the number of lines in the array is greater than zero. If the answer to the query at step 448 is yes, then the flow proceeds to step 450 where the lines are organized into groups of cause lines. For example, using cause-and-effect diagram 330 in FIG. 14, all of the lines coupled to cause line 344 would be a group of cause lines. The same holds true for cause lines 346, 348, and 350. It is noted that cause lines 358, 360, and 362 would also form a subgroup of cause lines for diagram 330.

Next at step 452, a query is made as to whether the number of lines in each group is greater than zero. If it is, then the flow proceeds to step 454 where the line size of the edited line is matched to the size of lines in the existing group. From step 454, the flow proceeds to step 456 where a query is made as to whether the offset suggested by analysis at step 454 is within the predetermined range for connection to the line. If the answer is yes at step 456, then the flow proceeds to step 458 where the mouse point is offset to the desired range. From there function 402 for aligning an edited cause line is exited at step 460.

Returning to step 452, if the answer to the query is no, then the flow proceeds to step 462 where a query is made as to whether the preference to use the grid is on. If the answer to this query is yes, then the flow proceeds to step 464 where the alignment of the line to the grid location is set.

The flow then proceeds to step 465 by either a no at the query of step 462 or from completing step 464. Regardless of whether the answer to the query at 462 was no, at step 465, a query is made as to whether the control key on keyboard 20 is pressed. If the control key is not pressed, then the orientation of the line with its parent line is limited to 15° increments when released at step 464. If the control key is pressed, then no limitation is applied and the return from determine snap alignment for the line step 402 may be exited at step 460. It is noted that step 462 may also be entered if the answer to the query at step 452 is no. By this way, an alignment of an edited or moved line to the other lines in the chart can be ensured to provide clear and precise graphics.

Figure 19:
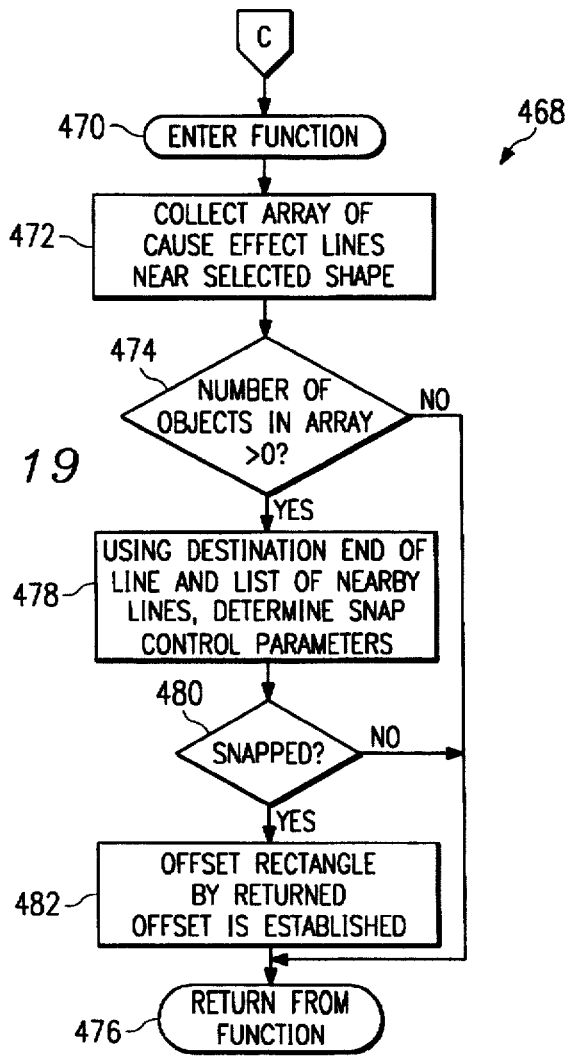
FIG. 19 illustrates steps performed when a shape is moved in a cause-and-effect diagram generated with the present system.

FIG. 19 illustrates the steps performed by the present system when a shape, such as cause boxes 334, 336, 338, 340, or effect box 332 in FIG. 14, is moved in a cause-and-effect diagram generated with the present system. Moving a shape function 468 is entered at step 470 when the user uses the mouse pointer to select a shape to be moved. Next, at step 472, an array of cause lines near the selected shape is collected. Next, at step 474, a query is made as to whether the number of lines in the array is greater than zero. If the answer to the query at step 474 is no, then at step 476, the function is exited. If, however, the answer to the query at step 474 is yes, then the flow proceeds to step 478 where, using the destination end of the line and the list of nearby lines, step 390 previously described may be entered for generating snap control parameters for the shape.

Once the snap control parameters are determined at step 478, the flow proceeds to step 480. At step 480 a query is made as to whether the moving line is snapped. If the answer is no, then the flow proceeds to step 476 where the function is exited. If the answer at step 480 is yes, then the flow proceeds to step 482 where the offset rectangle for the moving shape is established for moving the shape on the chart. Then the flow proceeds to step 476 where the function is exited. By flow 468 in FIG. 19, a shape can be moved within a cause-and-effect diagram and placed to the desired location on the diagram.

Figure 20A:
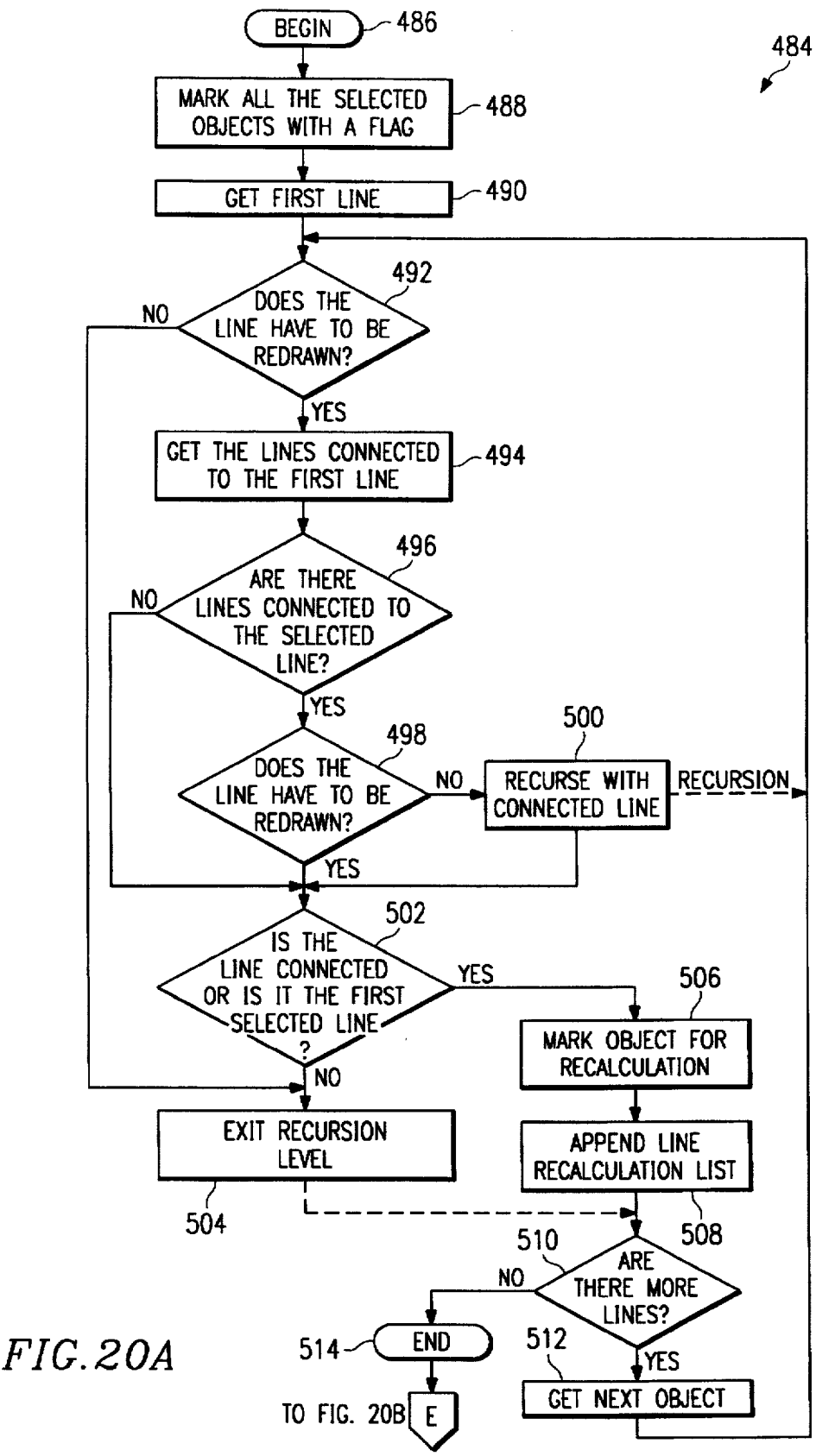
FIGS. 20A and 20B provide a flow chart for recalculating a cause-and-effect diagram generated in accordance with the present invention.
Figure 20B:
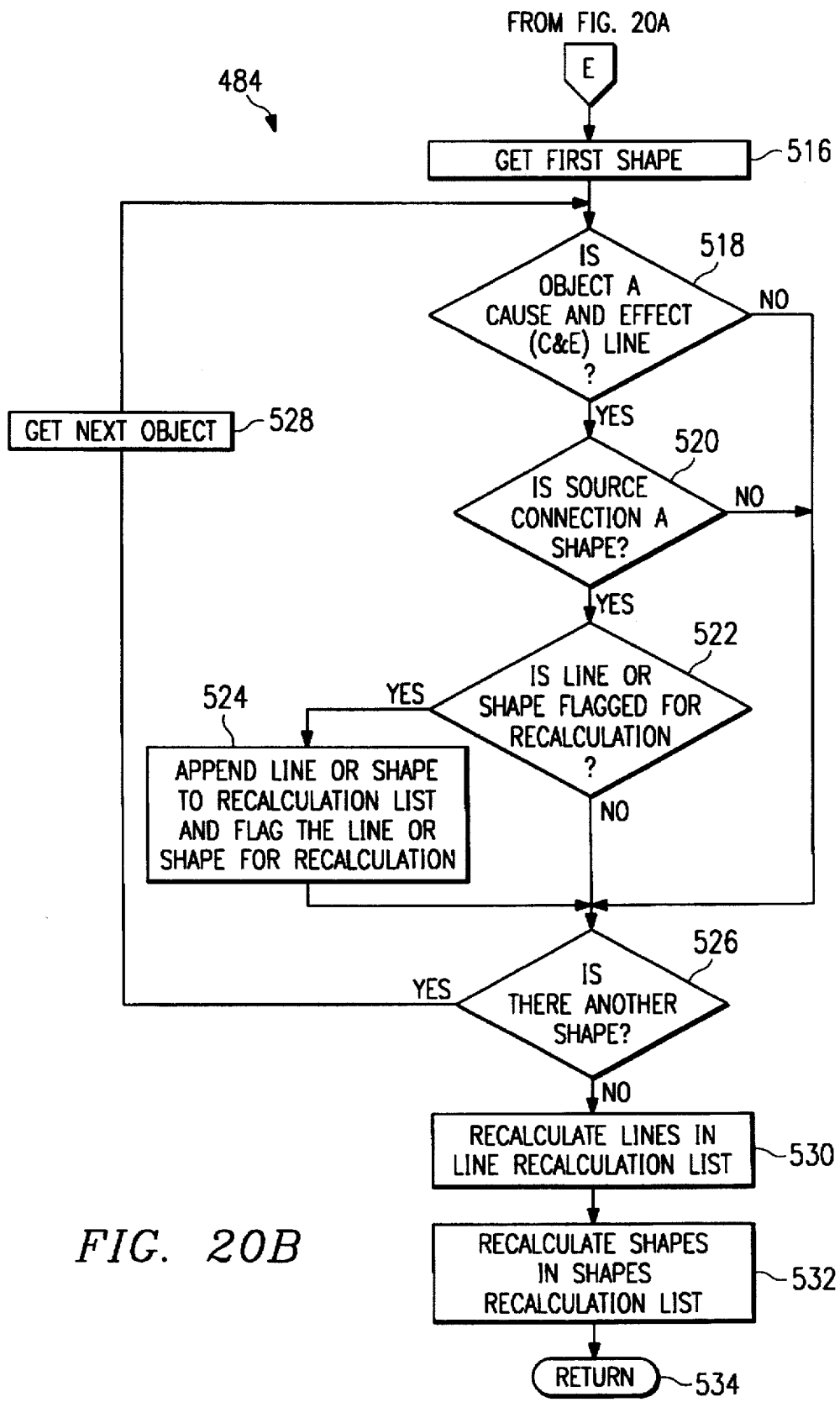

FIGS. 20A and 20B illustrate exemplary steps executed by the present system and method for recalculating a cause-and-effect diagram in accordance with the present invention. Flow 484 is entered whenever a user has just edited a line or moved a shape in an existing diagram. All lines are assumed to have pointers to the source and destination connections. At step 488, all the shapes and lines that have been moved or selected are marked with a flag. Next, at step 490, the first line in the list of lines having been flagged at step 488 is retrieved. At step 492, a query is made as to whether the line has been flagged to be redrawn. If the answer to the query is yes, then the flow proceeds to step 494 where all the lines connected to the first line are retrieved and stored. Next, at step 496, a query is made as to whether there are any subcause lines connected to the selected line. If the answer is yes, then the flow proceeds to step 498 where another query is made as to whether the subcause lines have been flagged to be redrawn. If the answer to the query at step 498 is no, then the flow proceeds to step 500 where recursion of all the connected lines is initiated. During recursion all the lines that are connected to the cause line are gathered so that they may also be redrawn. From step 500, the flow will either proceed to step 502 or back to step 492 where the recursion through the level of flagged lines to be redrawn occurs.

At step 502, a query is made as to whether the line is connected or is the first selected line. Step 502 is entered when the query at step 496 is no, when the answer to the query at step 498 is yes, or whether the levels of recursions is completed at step 500. If the answer to the query at step 502 is no, then the flow proceeds to step 504 where the recursion level is exited. If the answer at step 502 is yes, then the flow proceeds to step 506 where the object is marked for recalculation. From there, the object is added to the line recalculation list at step 508. Returning to step 492, if the answer to the query is no, then the flow would proceed to exit recursion level 504.

From either append line to recalculation list step 508 or exit recursion level 504, the flow then proceeds to query 510. At query 510, the question is asked whether there are more lines to be analyzed. If the answer is yes, then the flow proceeds to step 512 where the next line is retrieved and the entire recursion process is repeated. If the answer to the query at step 510 is no, then the flow proceeds to the end 514. An ordered list of lines that need to be recalculated or redrawn has been determined at step 510.

From step 514 the flow proceeds to step 516 where the first shape to be withdrawn is retrieved. Next, the flow proceeds to step 518 where a query asks whether the shape is a cause line. If the answer is yes, then a query is made at step 520 as to whether the cause-and-effect line has a connection to a shape. If the answer to that query is yes, then the flow proceeds to 522 where a query is made as to whether the line or shape is flagged for recalculation. If the answer to query at step 522 is yes, then the flow proceeds to step 524 where the line or shape is appended to the recalculation list and the line or shape is flagged for recalculation.

If the answer to the queries at steps 518, 520, and 522 is no, then the flow proceeds to step 526. At step 526, a query is made as to whether there are other shapes to be analyzed. If the answer is yes, then the next object is retrieved at step 528 and the entire process is repeated. If the answer to the query at step 526 is that there are no additional objects to be analyzed, then at step 530, the lines in the line recalculation list are recalculated and at step 532, the shapes in the shape recalculation list are recalculated. Finally, at step 534, the program flow returns from flow 484.

The present invention provides several technical advantages. The present system and method provide several tools that allow a user to quickly and easily create clean and professional looking graphics. The present invention provides a system that controls the placement of objects in a graphics chart. Additionally, the present invention provides a tool for integrating objects and data into a chart. This eliminates the need for maintaining separate graphics and spreadsheet documents. Also, the present invention provides a method and system for generating cause and effect diagrams. Cause and effect diagrams generated in accordance with the present invention allow the user to directly enter text and shapes to the cause and effect diagram as well as to add additional cause and subcause lines to the chart. The present invention also redraws an edited cause and effect diagram so as to maintain the Clean and professional look of the diagram.

It is noted that the shape placement control, data fields, and cause-and-effect diagram functions described can operate with one another to help the user quickly and efficiently create clean, professional graphics.

Although the present invention has been described in detail, it should be understood that various changes, substitutions, and alterations can be made hereto without departing from the spirit and scope of the invention as defined by the appended claims.

What is claimed is:

1. A computer graphics system for generating graphics charts on a computer display, the system comprising:
   a computer-readable medium; and
   a computer program encoded on the computer-readable medium, the computer program further comprising:
      means for placing a plurality of shapes in a chart on the display,
      means for maintaining positioning coordinates for each shape in the chart,
      means responsive to a move command for moving one of the shapes with respect to the stationary shapes in the chart,
      means for comparing the distance between each of the stationary shapes and the moving shape as the moving shape is moved in the chart, and
      means for setting release coordinates for the moving shape with respect to at least one stationary shape when the moving shape is brought within a predetermined offset to a first distance from the at least one stationary shape.

2. The computer graphics system of claim 1 wherein the first distance comprises one of a horizontal distance from the at least one stationary shape and a vertical distance from the at least one stationary shape.

3. The computer graphics system of claim 1 wherein the comparing means further comprises:
   means for determining a centerline for the at least one stationary shape;
   means for determining the difference between the centerline and the moving shape's edges; and
   means for recognizing when the difference between the centerline and the moving shape's edges is within the predetermined offset of the first distance.

4. The computer graphics system of claim 1 wherein the release coordinates position the moving shape and the at least one stationary shape so as to share a common side.

5. The computer graphics system of claim 1 wherein the comparing means further comprises:
   means for determining coordinates for the moving shape's corners;
   means for determining coordinates for the at least one stationary shapes corners adjacent to the moving shape; and
   means for recognizing when the difference between the moving shape's corners and the at least one stationary shape is within the predetermined offset of the first distance.

6. A method performed by a computer for controlling the placement of a shape on a graphics chart generated with the computer, the method comprising the steps of:
   maintaining positioning coordinates for each shape in the chart;
   maintaining positioning coordinates for a moving shape with respect to the stationary shapes while the moving shape is moving in the chart;
   comparing the distance between each of the stationary shapes and the moving shape as the moving shape is moved in the chart; and
   setting release coordinates for the moving shape with respect to at least one stationary shape when the moving shape is brought within a predetermined offset to a first distance from the at least one stationary shape.

7. The method of claim 6 wherein the first distance comprises one of a horizontal distance from the at least one stationary shape and a vertical distance from the at least one stationary shape.

8. The method of claim 6 wherein the comparing step further comprises the steps of:
   determining a centerline for the at least one stationary shape;
   determining the difference between the centerline and moving shape's edges; and
   recognizing when the difference between the centerline and the edges is within the predetermined offset of the first distance.

9. The method of claim 6 wherein the release coordinates places the moving shape and the at least one stationary shape so as to share a common side.

10. The method of claim 6 wherein the comparing step further comprises:
    determining coordinates for the moving shape's corners;
    determining coordinates for the at least one stationary shapes corners adjacent to the moving shape; and
    recognizing when the difference between the moving shape's corners and the at least one stationary shape is within the predetermined offset of the first distance.

11. A computer graphics system for generating graphics charts on a computer display, the system comprising:
    a computer-readable medium; and
    a computer program encoded on the computer-readable medium, the computer program further comprising:
       means for placing a plurality of shapes in a chart on the display,
       means for maintaining positioning coordinates for each shape in the chart,
       means responsive to a move command for moving one of the shapes with respect to the stationary shapes in the chart,
       means for comparing the location between each of the stationary shapes and the moving shape as the moving shape is moved in the chart,
       means for determining when the coordinates for the moving shape coincide at least in part with the coordinates for at least one of the stationary shapes, and
       means for setting release coordinates for the moving shape with respect to the at least one stationary shape to align with a channel extending from the at least one stationary shape so that the moving shape aligns with the at least one stationary shape when the moving shape is released.

12. The computer graphics system of claim 11 wherein the channel extending from the at least one stationary shape extends in at least one of a horizontal and vertical direction from the at least one stationary shape.

13. A method performed by a computer for controlling the placement of a shape on a graphics chart generated with the computer, the method comprising the steps of:
   maintaining positioning coordinates for each shape in the chart;
   maintaining positioning coordinates for a moving shape with respect to the stationary shapes while the moving shape is moving in the chart;
   comparing the positioning coordinates between each of the stationary shapes and the moving shape as the moving shape is moved in the chart;
   determining when the coordinates for the moving shape coincide at least in part with the coordinates for at least one stationary shape; and
   setting release coordinates for the moving shape with respect to the at least one stationary shape to align with a channel extending from the at least one stationary shape so that the moving shape aligns with the at least one stationary shape when the moving shape is released.

14. The method of claim 13 wherein the channel extending from the at least one stationary shape extends in at least one of a horizontal and vertical direction from the at least one stationary shape.

15. A computer graphics system for generating a cause and effect chart on a computer display, the system comprising:
   a computer-readable medium; and
   a computer program encoded on the computer-readable medium, the computer program further comprising:
   means for generating a cause and effect chart template containing a plurality of cause lines and cause text on the display, and
   means for entering customized text onto the cause and effect chart template on the display.

16. The computer graphics system of claim 15 further comprising means for adding cause lines to the chart.

17. The computer graphics system of claim 15 further comprising means for deleting at least one of cause lines and cause text from the chart.

18. The computer graphics system of claim 15 further comprising means for adding subcause lines to the chart.

19. The computer graphics system of claim 15 further comprising means for adding shapes to the chart.

20. The computer graphics system of claim 15 further comprising means for moving a cause line in the chart.

21. The computer graphics system of claim 15 further comprising means for moving a group of related cause lines in the chart and for redrawing the group of related cause lines at a destination in their original configuration.

22. The computer graphics system of claim 15 further comprising means for setting the length of related cause lines to a uniform length.

23. A method performed by a computer for generating a cause and effect chart on a computer display, the method comprising the steps of:
   generating on the display a cause and effect chart template containing a plurality of cause lines and cause text; and
   displaying customized text entered directly into the cause and effect chart template.

24. The method of claim 23 further comprising the step of adding additional cause lines and cause text to the chart responsive to a command.

25. The method of claim 23 further comprising the step of deleting cause lines and cause text from the chart responsive to a command.

26. The method of claim 23 further comprising the step of adding additional subcause lines to the chart responsive to a command.

27. The method of claim 23 further comprising the step of adding shapes to the chart responsive to a command.

28. The method of claim 23 further comprising the step of redrawing a group of related cause lines at a new position in the chart in their original configuration responsive to a command.

29. The method of claim 23 further comprising the step of controlling the length of related cause lines.

30. A computer graphics system for generating a graphics chart containing objects and data on a computer display, the system comprising:
   a computer-readable medium; and
   a computer program encoded on the computer-readable medium, the computer program further comprising:
   means for placing a plurality of objects on the chart,
   means for accepting data, and
   means for relating data for each object to the object.

31. The computer system of claim 30 wherein the objects comprise at least one of shapes and lines.

32. The computer system of claim 30 further comprising means for displaying the data for each object with each object.

33. The computer system of claim 30 further comprising means for summarizing the data for all objects in a chart.

34. The computer system of claim 30 further comprising means for linking the data of a plurality of related charts.

35. The computer system of claim 30 further comprising means for setting preferences for the data that may be entered for each object in the chart.

36. The computer system of claim 30 further comprising means for validating the data entered for given object against the preferences for the chart.

37. The computer system of claim 30 further comprising means for performing mathematical operations on the data entered in the chart.

38. A method performed by a computer for generating a computer graphics chart containing objects and data on a computer display, the method comprising the steps of:
   generating on the display a plurality of objects;
   receiving data for the chart; and
   relating the data for each object to the object.

39. The method of claim 38 further comprising the step of displaying the data for each object with each object.

40. The method of claim 38 wherein the objects comprise at least one of shapes and lines.

41. The method of claim 38 further comprising the step of summarizing the data for all objects in a chart.

42. The method of claim 38 further comprising the step of linking the data for the objects of a plurality of related charts.

43. The method of claim 38 further comprising the step of setting preferences for the data that may be entered for each object in the chart.

44. The method of claim 38 further comprising the step of validating the data entered for a given object against the preferences for the chart.

45. The method of claim 38 further comprising the step of performing mathematical operations on the data entered in the chart.

46. A computer readable medium encoded with program instructions to execute, on a computer, the following steps:
   displaying a first shape and a second shape;
   maintaining a location for each shape;
   moving the first shape with respect to the second shape;

comparing the location of the first shape to the location of the second shape;

determining release coordinates for the first shape with respect to the second shape; and repositioning the first shape according to the release coordinates.

47. The computer readable medium of claim 46 wherein the comparing step further comprises:

comparing a separation distance between a corner of the first shape and a corner of the second shape; and storing the release coordinates that position the first shape and the second shape so as to share a common side in response to the separation distance being within a predetermined snap together offset distance.

48. The computer readable medium of claim 47 wherein:

the separation distance comprises one of a horizontal separation distance and a vertical separation distance; and the predetermined snap together offset distance comprises one of a horizontal snap together offset distance and a vertical snap together offset distance.

49. The computer readable medium of claim 46 wherein the comparing step further comprises:

determining a channel extending from the second shape; and storing the release coordinates that position the first shape so as to align with the channel in response to the first shape entering the channel.

50. The computer readable medium of claim 49 wherein the channel comprises one of a horizontal channel extending from the second shape and a vertical channel extending from the second shape.

51. The computer readable medium of claim 46 wherein the comparing step further comprises:

determining a channel extending from the second shape;

storing the release coordinates that position the first shape so as to align with the channel in response to the location of the first shape at least partly coinciding with the location of the second shape during the movement of the first shape.

52. The computer readable medium of claim 51 wherein the channel comprises one of a horizontal channel extending from the second shape and a vertical channel extending from the second shape.

53. The computer readable medium of claim 46 wherein the comparing step further comprises:

determining a first shape centerline;

determining a second shape centerline;

comparing spacing distances from the first shape centerline and an edge of the first shape to the second shape centerline;

determining the spacing distance that is a closest match to a predetermined smart shape spacing distance; and storing the release coordinates that position the first shape with respect to the second shape at the predetermined smart shape spacing distance in response to the closest match being less than the predetermined smart shape spacing distance.

54. The computer readable medium of claim 53 wherein the first shape centerline comprises one of a horizontal first shape centerline and a vertical first shape centerline.

55. The computer readable medium of claim 53 wherein the second shape centerline comprises one of a horizontal second shape centerline and a vertical second shape centerline.

56. The computer readable medium of claim 53 wherein the predetermined smart shape spacing distance comprises one of a horizontal smart shape spacing distance and a vertical smart shape spacing distance.

* * * * *